(12) United States Patent
Ringseth et al.

(10) Patent No.: US 6,625,804 B1
(45) Date of Patent: Sep. 23, 2003

(54) UNIFIED EVENT PROGRAMMING MODEL

(75) Inventors: Paul F. Ringseth, Redmond, WA (US); Roland L. Fernandez, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 09/611,401

(22) Filed: Jul. 6, 2000

(51) Int. Cl.[7] .................................................. G06F 9/44
(52) U.S. Cl. ....................... 717/114; 717/104; 717/107; 717/140; 717/165; 709/230; 709/310; 709/318
(58) Field of Search ................................. 709/230, 310, 709/318; 717/104, 105, 106, 108, 112, 114, 116, 140, 165

(56) References Cited

U.S. PATENT DOCUMENTS

| | | | | |
|---|---|---|---|---|
| 5,999,728 A | * | 12/1999 | Cable ........................... | 717/105 |
| 6,167,564 A | * | 12/2000 | Fontana et al. .............. | 717/104 |
| 6,182,024 B1 | * | 1/2001 | Gangopadhyay et al. ..... | 703/22 |
| 6,347,342 B1 | * | 2/2002 | Marcos et al. ............... | 709/315 |
| 6,385,769 B1 | * | 5/2002 | Lewallen ..................... | 717/125 |
| 6,408,342 B1 | * | 6/2002 | Moore et al. ................ | 709/330 |
| 6,510,550 B1 | * | 1/2003 | Hightower et al. .......... | 717/108 |

OTHER PUBLICATIONS

Silva et al., "User Interface Modelling with UML".*
Grundy et al, "Towards a Unified Event–based Software Architecture", ACM, SIGSOFT 96 Workshop, 1996, p 121–125.*
Needham et al., "ADAM: A Language–Independent, Object– Oriented, Design Environment for Modeling Inheritance and Relationship Variants in ADA 95, C++, and Effel", ACM, 1996.*
"OMG Unified Modeling Language Specification", Object Management Group, up to section 1.*
Quatrani, Terry; "Visual Modeling with Rational Rose and UML"; Addison Wesley Longman, Inc.; Apr. 1998.*
Kraig Brockschmidt, *Inside OLE*, Second Edition, "Chapter 4, Connectable Objects," Microsoft Programming Series, Microsoft Press, pp. 187–218, 1995.
Kraig Brockschmidt, *Inside OLE*, Second Edition, "Chapter 24, An Introduction to OLE Controls," Microsoft Programming Series, Microsoft Press, pp. 11/1–1144, 1995.
Jeff Prosise, *Programming Windows with MFC*, Second Edition, "Chapter 21, ActiveX Controls," Microsoft Programming Series, Microsoft Press, pp. 1225–1291, 1999.
Laurence Vanhelsuwé, *Mastering Java Beans*, "Chapter 2, JavaBeans: An Overview," Sybex Inc., pp. 40–66, 1997.
Laurence Vanhelsuwé, *Mastering Java Beans*, "Chapter 3, The Java 1.1 Delegation Event Model," Sybex Inc., pp. 70–145, 1997.
Laurence Vanhelsuwé, *Mastering Java Beans*, "Chapter 4, Bean Properties," Sybex Inc., pp. 148–209, 1997.

(List continued on next page.)

*Primary Examiner*—Kakali Chaki
*Assistant Examiner*—William H. Wood
(74) *Attorney, Agent, or Firm*—Klarquist Sparkman, LLP

(57) ABSTRACT

A unified event programming model standardizes event programming for disparate eventing protocols. The unified event programming model simplifies programming events for different object types by abstracting away protocol-specific details. A protocol-independent compiler construct allows a programmer to specify events for an event source. Other protocol-independent compiler constructs allow a programmer to specify how to hook and unhook an event receiver from events. Based upon protocol-independent compiler constructs and an eventing protocol type value, a compiler generates an event source or event receiver implementation that is specific to an eventing protocol.

29 Claims, 23 Drawing Sheets

OTHER PUBLICATIONS

Laurence Vanhelsuwé, *Mastering Java Beans*, "Chapter 5, Bean Events," Sybex Inc., pp. 212–288.

Microsoft Developer Network, "C# Introduction and Overview," 4 pp. [online] [retrieved on Jun. 30, 2000 from http://www.msdn.microsoft.com/vstudio/nextgen/technology/csharpintro.asp].

Microsoft Developer Network, "C# Reference," 26 pp. [online] [retrieved on Jun. 30, 2000 from http://msdn.microsoft.com/library/prelim/csref/vcoriCReference.htm].

Borland, "C++ Builder 5 Quick Start: Chapters 2–4," 68 pp. [online] [retrieved on Jun. 30, 2000 from http://www.borland.com/techpubs/bcppbuilder/v5/qs/title..htm1].

Microsoft Developer Network, "COM+ Technical Series: Loosely Coupled Events," 6 pp. [online] [retrieved on Jun. 30, 2000 from http://msdn.microsoft.com/library/techart/compluscouple.htm].

Microsoft Developer Network, "Adding Connection Points to an Object," 14 pp. [online] [retrieved on Jun. 14, 2000 from http://msdn.microsoft.com/library/devprods/vs6/visualc/vcmfc/_atl_adding_connection_points_to_an_object.htm].

Microsoft Developer Network, "Architecture of Connectable Objects," 20 pp. [online] [retrieved on Jun. 10, 2000 from http://msdn.microsoft.com/library/psdk/com/events_5h4j.htm].

Microsoft Developer Network, "Connection Points," 3 pp. [online] [retrieved on Jun. 10, 2000 from http://msdn.microsoft.com/library/devprods/vs6/visualc/vccore/_core_connection_points.htm].

Microsoft Developer Network, "Handling Events in WFC," 5 pp. [online] [retrieved on Jun. 10, 2000 from http://msdn.microsoft.com/library/devprods/vs6/visualj/vjc.../vjconhandlingeventsinwfc.htm].

Microsoft Developer Network, "Delegates in Visual J++ 6.0," 6 pp. [online] [retrieved on Jun. 10, 2000 from http://msdn.microsoft.com/library/techart/msdn_delegates.htm].

Kirtland, M., "Object–Oriented Software Development Made Simple With COM+ Runtime Services," *Microsoft Systems Journal*, vol. 12, pp. 49–59 (Nov. 1997).

* cited by examiner

FIGURE 7

```
namespace N { // namespace is optional
[event_source(native)]  ←—710
struct Source {
    __event long __stdcall Up(int i);  ←—720
    __event void Down(int i, float j);  ←—730
    void FireUpDown() {  ←—740
        __raise Up(7);
        Down(7, 3.14159);
    }
};
}
```

700

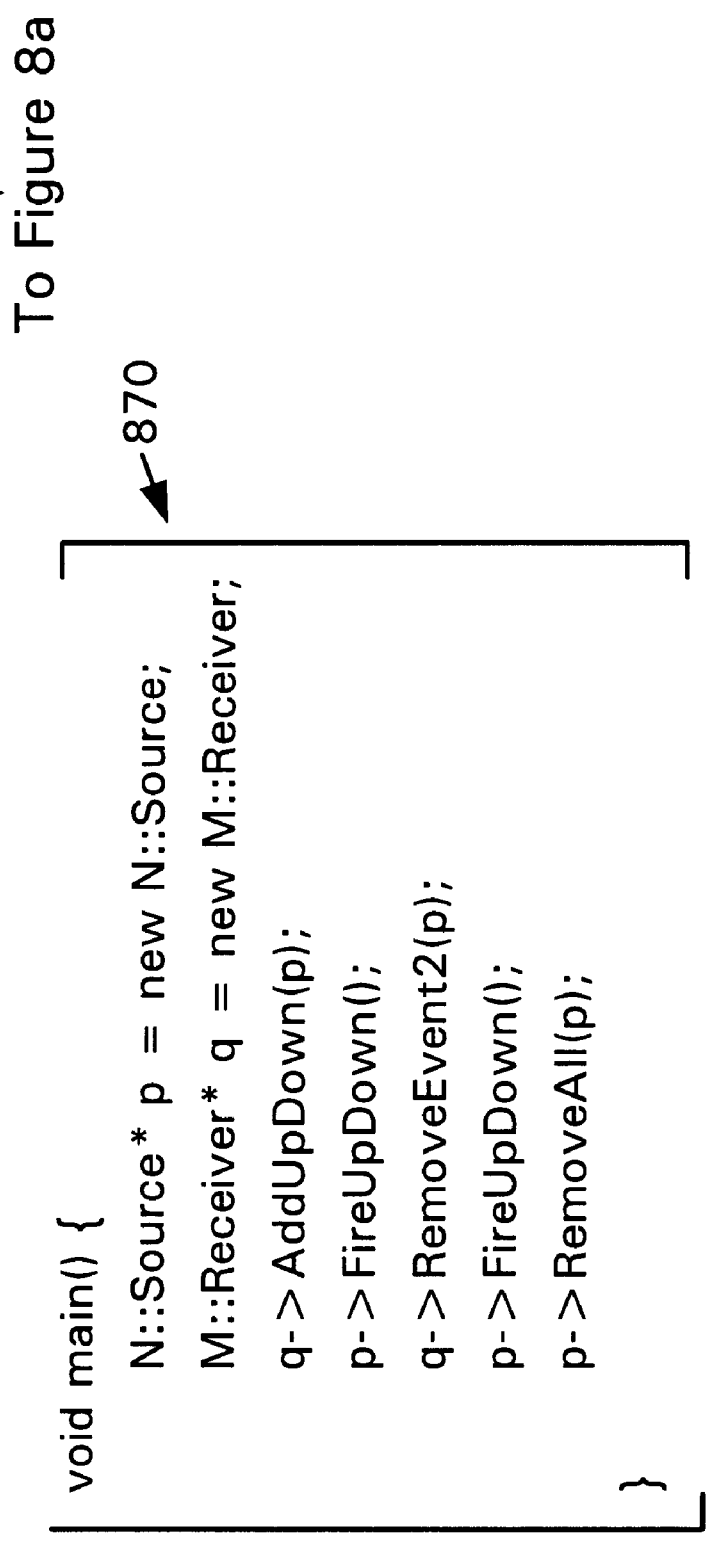

FIGURE 10a

```
// pre.h
#define _ATL_ATTRIBUTES 1
#include <atlbase.h>
#include <atlcom.h>
extern "C" int printf(...);
struct DECLSPEC_UUID("530DF3AD-6936-3214-A83B-27B63C7997C4") CSource;

[export] enum E {
    e = 17
};
[export] struct S {
    int i, j;
};

[dispinterface] __interface IEvent : IDispatch {
    [id(34)] void Grade([in] E, [in] char*);
    [id(18)] HRESULT Score([in]S* a, [in]float b, [in]VARIANT c);
};
```

```
[object, library_block] __interface IEvent2 : IUnknown {      ⟵ 1020
    void __cdecl Display(void);
    int Grade([in]int);
    HRESULT Score([in]int, [in]float);
};
namespace N {
    [dual] __interface IJW {                                   ⟵ 1030
        HRESULT Grade([in]int);
    };
}
[dual] __interface IBase {                                     ⟵ 1040
    HRESULT FireSome();
};
```

```
#include "pre.h"
[project(name = source)];
[coclass, threading(both), event_source(com)]  ← 1110
struct CSource : IBase {

__event __interface IEvent;
    __event __interface IEvent2;      ← 1120
    __event __interface N::IJW;

HRESULT FireSome() {
        Grade((E) 'h', "hi");
        VARIANT v;
        VariantInit(&v);
        V_VT(&v) = VT_I4;
        V_I4(&v) = 866;                ← 1130
        Score(0, 3.14159, v);
        IEvent2_Grade(366);
        Score(97, 2.71);
        Display();
        return N_IJW_Grade(8);
    }
};
```

```
[event_receiver(com, true)]  ← 1310
struct CSink : IEvent {
    void Grade(E c, char* pc) {
        printf("CSink::Grade(this = %p,c = %c,pc = %s)\n", this, c, pc);   ← 1320
    }
    HRESULT Score(S* i, float j, VARIANT c) {
        printf("CSink::Score(i = %d,j = %lf,c = %p)\n", i, j, &c);   ← 1330
        return S_OK;
    }
    CSink(IBase* pS) {
        __hook(IEvent, pS);                ← 1340
    }
    void UnHook(IBase* pS) {
        __unhook(IEvent, _pS);             ← 1350
    }
};
```

```
#include "pre.h"
[project(name=sink)];
[event_receiver(com)]          ←1510
struct CSink {
    void __cdecl f0() {
        printf("CSink::f0(this = %p)\n", this);            ←1520
    }
    HRESULT f1() {
        printf("CSink::f1(this = %p)\n", this);            ←1521
        return S_OK;
    }
    void f2(E c, char* pc) {
        printf("CSink::f2(this = %p,c = %c,pc = %s)\n", this, c, pc);   ←1522
    }
    static HRESULT f3(S* i, float j, VARIANT c) {
        printf("CSink::f3(i = %d,j = %lf,c = %p)\n", i, j, &c);         ←1523
        return S_OK;
    }
    int f4(int i) {
        printf("CSink::f4(this = %p,i = %d)\n", this, i);               ←1524
        return 0;
    }
}
```

```
HRESULT f5(int i, float j) {
    printf("CSink::f5(this = %p, i = %d, j = %lf)\n", this, i, j);    ⎫
    return S_OK;                                                       ⎬ 1525
}                                                                      ⎭ void fdyn(HRESULT hr) {                    ⎫
    printf("CSink::fdyn(hr = 0x%x)\n", hr); ⎬ 1530
}                                           ⎭

CSink(IBase* pS) {                                    ⎫
    fdyn(_hook(&IEvent2::Score, pS, &CSink::f3));     │
    _hook(&IEvent2::Grade, pS, &CSink::f4);           │
    _hook(&N::IJW::Grade, pS, &CSink::f1);            ⎬ 1540
    _hook(&IEvent2::Score, pS, &CSink::f5);           │
    _hook(&IEvent2::Display, pS, &CSink::f0);         │
    _hook(&IEvent::Grade, pS, &CSink::f2);            ⎭
} void UnHook(IBase* pS) {                   ⎫
    fdyn(_unhook(IEvent2, _pS));           │
    _unhook(&IEvent2::Grade, pS, &CSink::f2); ⎬ 1550
    _unhook(&IEvent::Score, pS, &CSink::f3);  │
    _unhook(&N::IJW::Grade, pS, &CSink::f1);  ⎭
}
```

```
void UnHookAll(IBase* pS) {
    __unhook(pS);                              ← 1560    To Figure 15b
}
};

void main() {
    CoInitialize(NULL);
    IBase* pS = 0;
    HRESULT hr = CoCreateInstance(__uuidof(CSource), NULL, CLSCTX_ALL, __uuidof(IBase), (void **)&pS);   ← 1570
    if (FAILED(hr)) {
        return;
    }
    CSink sink(pS);
    pS->doSomething();
    sink.UnHook(pS);
    pS->doSomething();
    CoUninitialize();
}
```

```
__delegate(multicast) void ClickEventHandler(int x, double y);    ◄─1710
[event_source(com+)] // optional   ◄─1720
__gc class TMSrc {
private:
    __event ClickEventHandler* OnClick;              ◄─1730
    __event void OnDblClick(String* s);
public:
    void FireEvents() {                              ◄─1740
        OnClick(7, 3.14159);
        OnDblClick("seven pi");
    }
};
```

```
[event_receiver(com+)] // optional         ← 1810
_gc struct EventReceiver {
public:
    void Handler1(int x, double y) {
        printf("Click(x = %d, y = %lf)\n", x, y);
    }
    void Handler2(String* s) {                                    ← 1820
        printf("DblClick(s = %s)\n", s->ToCharArray());
    }
    void Handler3(String* s) {
        printf("DblClickAgain(s = %s)\n", s->ToCharArray());
    }
    void AddHandlers(EventSource* pES) {
        __hook(&EventSource::OnClick, pES, &EventReceiver::Handler1);
        __hook(&EventSource::OnDblClick, pES, &EventReceiver::Handler2);    ← 1830
        __hook(&EventSource::OnDblClick, pES, &EventReceiver::Handler3);
    }
    void RemoveHandlers(EventSource* pES) {
        __unhook(&EventSource::OnClick, pES, &EventReceiver::Handler1);
        __unhook(&EventSource::OnDblClick, pES, &EventReceiver::Handler2);  ← 1840
        __unhook(&EventSource::OnDblClick, pES, &EventReceiver::Handler3);
    }
};
```

```
void main() {
    EventSource* pES = new EventSource;
    EventReceiver* pER = new EventReceiver;

// add handlers
    pER->AddHandlers(pES);

pES->FireEvents();
    // or
    pES->OnClick(7, 3.14159);
    pES->OnDblClick("seven pi");

// remove handlers
    pER->RemoveHandlers(pES);
}
```

UNIFIED EVENT PROGRAMMING MODEL

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

TECHNICAL FIELD

The present invention pertains to a unified event programming model that standardizes event programming for disparate eventing protocols. The unified event programming model includes standard event programming compiler constructs.

BACKGROUND OF THE INVENTION

To manage the complexity of long computer programs, computer programmers often adopt object-oriented programming techniques. With these techniques, a computer program is organized as multiple smaller modules called objects. Each object performs specified functions and interacts with other objects in pre-defined ways. FIG. 1 shows several principles of object oriented programming with reference to an object 100 that interacts in pre-defined ways with a client 140 (which can also be an object)

The object 100 encapsulates data 110, which represents the current state of the object 100. The data 110 can be organized as data elements such as properties of the object 100. The object 100 exposes member functions (alternatively called methods) 120, 122, and 124 that provide access to the data 110 or provide some other defined function or service. To access the data 110, the client 140 of the object 100 calls a member function. In FIG. 1, the member functions 120, 122, 124 are grouped into an interface 126. FIG. 1 also includes an interface 130 (shown without member functions for simplicity).

The object 100 and the client 140 interact across the interfaces exposed by the object 100. For example, for the client 140 to invoke the member function 120, a function call in the client 140 identifies the member function 120, provides any data to be processed (e.g., input parameters for arguments), and indicates any data to be returned (e.g., output parameters for arguments, return values). Similarly, for the client 140 to set a value for a property of the data 110, the client 140 identifies the property and provides the value.

FIG. 1 shows a software object designed according to a particular object model. In fact, many different software object models exist, each establishing a set of conventions by which objects are designed and by which objects communicate. For example, an object model might specify how an interface is organized, how an object implements an interface, how an object exposes an interface to other objects, which methods are required, etc. Different object models provide different answers to these questions. A computer programmer can write code for a software object in any of numerous different programming languages.

Communication between objects can occur in two directions. For example, one object (an event receiver) can arrange with another object (an event source) to have that other object call back the first object when some event occurs. For example, suppose that the event receiver is for reacting to a mouse button clicked by a user and that the event source tracks the mouse button state. The event receiver can arrange with the event source to have the event source call back the event receiver when an event occurs. The event source calls back to the event receiver as the events happen, or asynchronously, rather than at a regular interval. A single event source can call back to multiple receivers registered for the event, in which case the callback is termed multicast.

Due to the effectiveness of events for object communication, many programming languages and software object models support events. Typically, each programming language and software object model has its own eventing protocol, and each of these eventing protocols has its own nuances and particular rules.

Different object models work best in different situations, so a programmer might need to know how to program for different kinds of objects. To use the eventing protocol for an object, however, a programmer must know the particular rules and nuances of that eventing protocol for that type of object. Unfortunately, no unified event programming model exists for programming an object to work with events according to different eventing protocols, independent of the actual eventing protocol used by the object for the events.

SUMMARY OF THE INVENTION

The present invention overcomes these problems through a unified event programming model ["UEPM"] that standardizes event programming for disparate eventing protocols. The UEPM provides a programmer with an easy to use and systematic way to program events for objects, regardless of which eventing protocol the objects actually use. This hides from the programmer the bulk of the eventing protocol-specific details relating to implementation of the objects.

The UEPM includes standard event programming compiler constructs. One construct allows a programmer to specify an eventing protocol for an object to use. For an event source object, a construct allows a programmer to indicate the event. For an event receiver object, constructs allow a programmer to indicate how to hook up the receiver to the source for the event, or later unhook the receiver. Using these constructs, a programmer can specify event relationships between an event source and an event receiver in a protocol-independent manner. From the constructs, the compiler generates a protocol-specific eventing implementation, which can be for any of several different eventing protocols. At compile time, the compiler can verify the existence of events and checks parameter types for receivers trying to hook to events. This type checking at compile time eliminates expensive run time type checking and simplifies debugging.

By allowing high-level specification of event relationships between objects, the UEPM also gives programmers a simple way to write objects of different object models that can interoperate for eventing.

BRIEF DESCRIPTION OF THE DRAWINGS

FIG. 7 shows a source code listing for a native event source class specified with the UEPM.

FIGS. 8a and 8b show a source code listing for a native event receiver class specified with the UEPM.

FIGS. 10a and 10b show a source code listing for source code that is common to the COM eventing protocol examples of FIGS. 11, 13, and 15a–15c.

FIG. 11 shows a source code listing for a COM event source class specified with the UEPM.

FIG. 13 shows a source code listing for a layout-dependent COM event receiver class.

FIGS. 15a–15c show a source code listing for a layout-independent COM event receiver class.

FIG. 17 shows a source code listing for a COM+ event source class specified with the UEPM.

FIGS. 18a and 18b show a source code listing for a COM+ event receiver class specified with the UEPM.

DETAILED DESCRIPTION OF AN ILLUSTRATIVE EMBODIMENT

Figure 1:
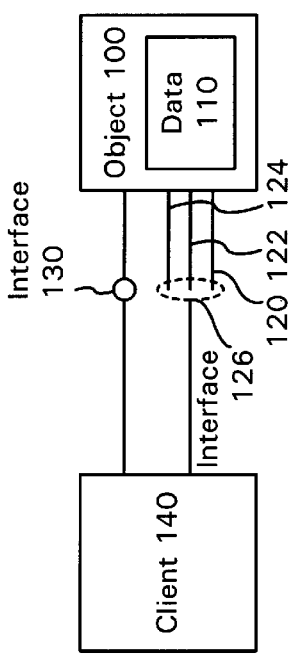
FIG. 1 is a block diagram of a software object and a client of the software object that interact across interfaces exposed by the software object according to the prior art.

The illustrative embodiment of the present invention is directed to a unified event programming model ["UEPM"] that simplifies event programming for native C++ ["native"], COM, and COM+ objects. By supporting events for native, COM, and COM+ objects, the UEPM of the illustrative embodiment serves programmers that use (and mix) all of these object types. The illustrative embodiment is also extensible to additional eventing protocols.

A C++ compiler recognizes a set of uniform event programming constructs and generates appropriate protocol-specific eventing code for an event source or an event receiver. This protocol-specific eventing code is fast, robust, and flexible, with emphasis on minimizing size for native, COM, and COM+ classes, and emphasis on maximizing speed for native, COM, and COM+ classes. A class is a software module from which an object is created at run time. A native class is a normal C++ class that does not define a COM object. A COM class is a C++ class that implements a COM object, usually with the help of a programming tool such as Microsoft Corporation's Active Template Library ["ATL"] or Microsoft Foundation Classes ["MFC"]. A COM+ class is a C++ class declared with the "__gc" keyword (or alternatively, declared in a managed context). The native, COM, and COM+ eventing protocols have many differences, but most of these differences are abstracted away by the UEPM.

The native eventing protocol is a type of a function pointer-based eventing protocol, and the COM eventing protocol is a type of an interface-based eventing protocol. The COM+ eventing protocol is a type of a delegate-based eventing protocol.

A native event source object implements an event as a linked list of pointers to member functions. Each node in the list includes a pointer to a receiver object, a pointer to a handler function in the receiver object, and a pointer to the next node. A COM event source object implements an event using a connection point object that holds an interface pointer for an event receiver. The COM event source fires events using the connection point protocol. A COM+ event source object implements an event through a delegate that acts as an intermediary between the event source object and an event receiver object.

COM and COM+ eventing protocols allow an event source and a hooked event receiver to exist in different threads, different processes, or even different machines, which raises marshaling concerns. In the illustrative embodiment, an eventing implementation for a COM or COM+ object works within the marshaling protocol established for such an object, with the details of the marshaling abstracted away from the event programmer. For native methods and events, however, there is no pre-supplied support for crossing process or machine boundaries.

Similarly, the illustrative embodiment utilizes the object tracking mechanisms of COM and COM+ to ensure that event sources do not hold references to event receivers that have been deleted. For a COM+ event receiver, the model uses a COM+ delegate that remains on the system as long as the event receiver does. For a COM event receiver, the model uses a reference count for the event receiver to keep the event receiver around as long as some event source holds a reference to it. For native objects, however, the model provides no support to prevent an event source from holding an invalid, "dangling" reference to an event receiver.

The illustrative embodiment permits subclassing of classes that source or receive events. A derived class can extend the eventing functionality of a parent class. This support for derived classes simplifies design of objects capable of eventing. The illustrative embodiment also permits events to be hooked to a source in a loop or using conditional logic in a function that receives the event source and the event handler as parameters. As long as the event source is typed (so that its events are visible for type checking), this dynamic specification of event source and method are possible.

The illustrative embodiment also facilitates interoperation between native, COM, and COM+ objects. An event receiver can receive events from any or all types of event sources.

In alternative embodiments, the present invention uses a programming language other than C++. The programming language can be C, Java, Basic, or any other language that allows a programmer to express computer processing instructions for an object in a symbolic manner largely independent of machine-specific details.

Although the illustrative embodiment describes native, COM, and COM+ objects and eventing protocols, alternative embodiments of the present invention use other object models and eventing protocols. In general, an object model is a set of conventions governing how objects are structured and interact with other objects. An eventing protocol for a particular object model indicates how to provide asynchronous multicast callbacks for objects of the object model. For example, alternative embodiments can support function pointer-based eventing protocols other than the native eventing protocol, interface-based eventing protocols other than the COM eventing protocol, or delegate-based eventing protocols other than the COM+ eventing protocol.

Instead of a C++ compiler environment, alternative embodiments use other programming environments to generate protocol-specific eventing code for an event source or an event receiver. A programming environment includes one or more development tools used to develop objects.

For example, in one alternative embodiment, a Java compiler environment facilitates creation of protocol-specific eventing code for a Java event source or event receiver (e.g., event listener) based upon uniform Java event programming constructs. The uniform Java event programming constructs can be used to program events according to any of multiple Java eventing protocols. In another alternative embodiment, a programming environment facilitates creation of protocol-specific eventing code for a CORBA-compliant event source or event receiver based upon uniform event programming constructs.

In general, the present invention can be applied to any group of multiple eventing protocols to provide a unified event programming model for that group of eventing protocols.

I. Computing Environment

Figure 2:
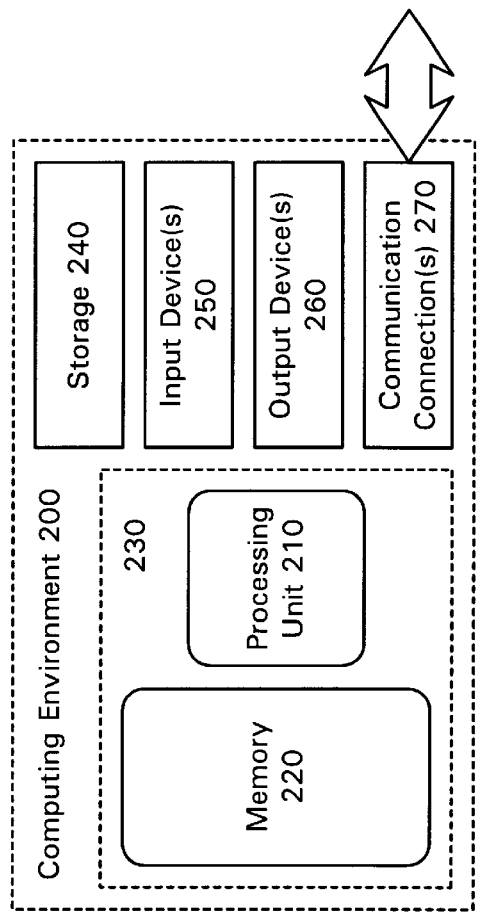
FIG. 2 is a block diagram of a computing environment that can be used to implement the illustrative embodiment.

FIG. 2 illustrates a generalized example of a suitable computing environment 200 in which the illustrative embodiment may be implemented. Computing environment 200 is not intended to suggest any limitation as to scope of use or functionality of the invention, as the present invention may be implemented in diverse general purpose or special purpose computing environments.

With reference to FIG. 2, computing environment 200 includes at least one processing unit 210 and memory 220. In FIG. 2, this most basic configuration is included within dashed line 230. The processing unit 210 executes computer-executable instructions and may be a real or a virtual processor. In a multi-processing system, multiple processing units execute computer executable instructions to increase processing power. Memory 220 may be volatile memory (e.g., registers, cache, RAM), non-volatile memory (e.g., ROM, EEPROM, flash memory, etc.), or some combination of the two. A computing environment may have additional features. For example, computing environment 200 includes storage 240, one or more input devices 250, one or more output devices 260, and one or more communication connections 270. A bus, controller, network, or other interconnection mechanism (not shown) interconnects the components of computing environment 200. Typically, operating system software (not shown) provides an operating environment for other software executing in the computing environment 200, and coordinates activities of the components of the computing environment 200.

Storage 240 may be removable or non-removable, and includes magnetic disks, magnetic tapes or cassettes, CD-ROMs, DVDs, or any other medium which can be used to store information and which can be accessed within computing environment 200.

Input device 250 may be a touch input device such as a keyboard, mouse, pen, or trackball, a voice input device, a scanning device, or another device that provides input to computing environment 200. Output device 260 may be a display, printer, speaker, or another device that provides output from computing environment 200.

Communication connection 270 enables communication over a communication medium to another computing entity. The communication medium conveys information such as computer executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer readable media. Computer readable media are any available media that can be accessed within a computing environment. By way of example, and not limitation, with computing environment 200, computer readable media include memory 220, storage 240, and communication media. Combinations of any of the above also fall within the definition of computer readable media.

The invention can be described in the general context of computer executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Generalized Eventing Framework

Figure 3:
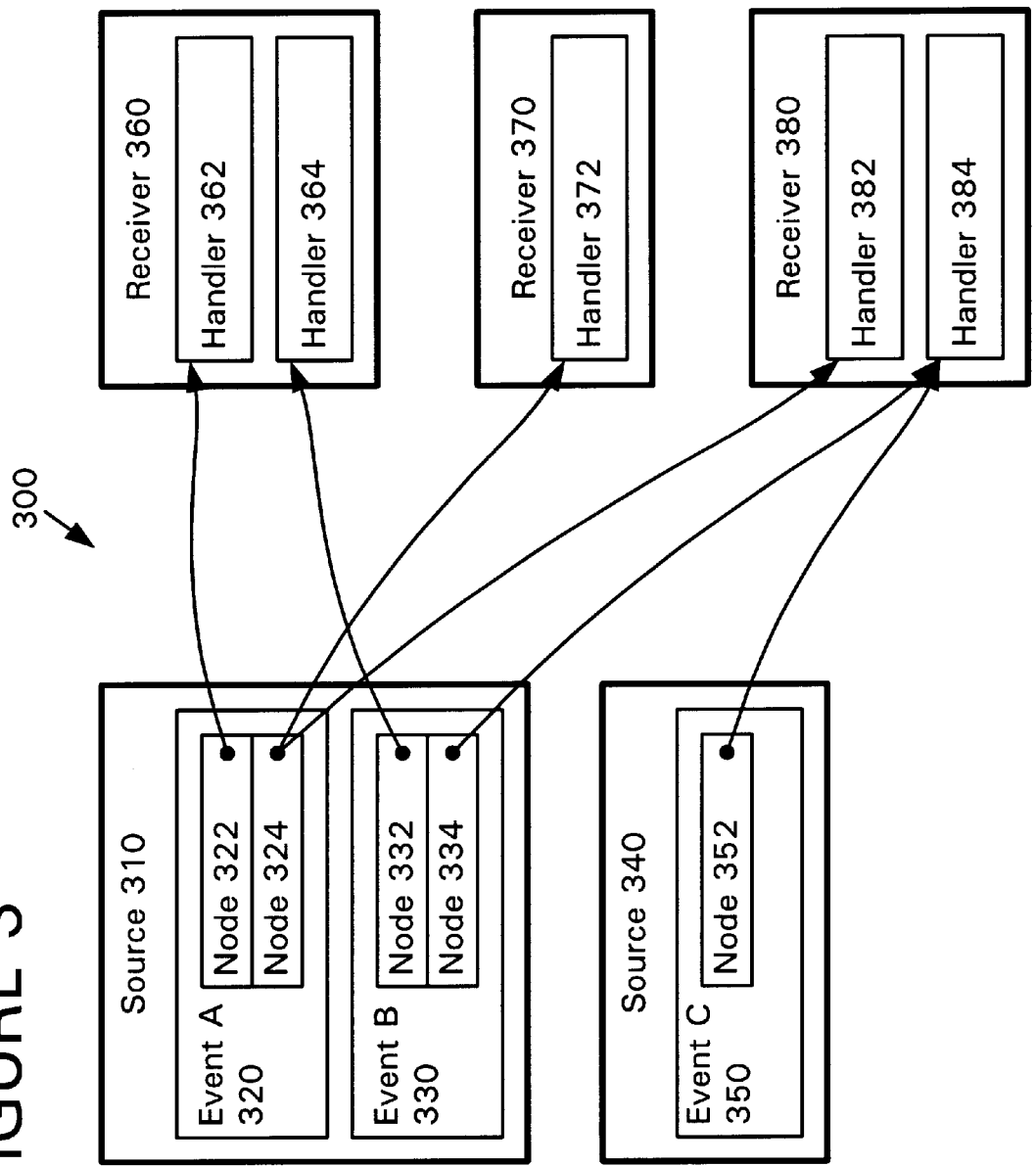
FIG. 3 is a block diagram of a generalized eventing framework upon which the UEPM is based.

FIG. 3 shows a generalized eventing framework 300 upon which the UEPM of the illustrative embodiment is based. FIG. 3 abstracts away the specifics of the native, COM, and COM+ eventing protocols, and is applicable to other object models and eventing protocols.

An event is an asynchronous multicast callback that signifies an action (such as a user clicking a mouse button) or an occurrence (such as a change in an object property) to which one or more event receivers respond. The event sources 310 and 340 are objects that generate events. The event receivers 360, 370, and 380 are objects that receive and respond to events. The term "event receiver" includes objects commonly called "sinks" and "listeners."

While the event sources 310 and 340 publish the types of events they make available, the event receivers 360, 370, 380 provide implementations for processing those events in their event handlers. The signature for an event handler typically matches the signature of the event it implements. In FIG. 3, the event source 310 includes an event "A" 320 and an event "B" 330, and the event source 340 includes an event "C" 350. The event receiver 360 includes event handlers, 362 and 364, which are methods on the event receiver 360 that process events. The event receivers 370 and 380 include event handlers 372, 382, and 384.

To receive an event, an event receiver hooks the event by registering for the event with the event source (or an object broker). An event receiver hooks events one at a time between an event source and one of the handlers of the event receiver. FIG. 3 represents a handler hooked to an event as a node associated with the event. Each node is an alias for an event handler (or synchronous group of event handlers). In the event source 310, the event "A" 320 has an associated node 322 that is an alias for the event handler 362 in the event receiver 360.

A node can be an alias for more than one event handler. Conversely, an event handler can receive events from more than one node. For example, the node 324 is an alias for the event handlers 372 and 382, while the event handler 384 receives events from the nodes 334 and 352. Although FIG. 3 shows a separate node list for each event, other configurations are possible, for example, a single node list for all events of an event source, with event identifiers for keys. FIG. 3 is illustrative only, and is not meant to imply any structural or architectural limitations on possible implementations for eventing protocols to represent hooked handlers. Alternative embodiments use other structures to represent hooked handlers for asynchronous multicast callbacks.

After hooking an event, the event handler is activated each time the event is raised. Raising the event, also called firing the event, results in the event source calling each of the nodes registered to receive that event, which in turn results in a call to the event handler handling the event.

As FIG. 3 shows, an event is semantically close to a list of pointers to member functions. In practice, the actual event specifies a signature by which the event is raised, but no implementation. The event source maintains a node list of hooked handlers for event receivers, where the handler can include a pointer to a handler function, an interface pointer, a pointer to a delegate for a handler function, etc. The handlers do the work of handling the event, and must be implemented.

An event receiver receives an event until the event handler is unhooked by unregistering it from the event source. A handler can be removed from the node list at any time, subject to thread locks. While the UEPM abstracts away the details of threading, the resulting implementation allows for single-threaded or multi-threaded usage, and protects data from simultaneous multithread access.

The techniques for hooking handlers, firing events, and unhooking handlers described with reference to FIG. 3 are illustrative only, and are not meant to imply any structural or architectural limitations on possible implementations for eventing protocols. Alternative embodiments use other techniques for hooking handlers, firing events, and unhooking handlers for asynchronous multicast callbacks.

III. Compiler Constructs

The UEPM simplifies specification of event source and event receiver objects. This frees a programmer from the complexities of protocol-specific event implementation when writing code for a class, and allows a programmer to concentrate on the functionality of the programmer's application.

In the UEPM, the syntax by which events are defined, implemented, and used is uniform and largely independent of eventing protocol-specific details. By design, the syntax is general enough to encompass future eventing protocols.

The UEPM includes compiler constructs that operate with reference to a generalized event framework such as that shown in FIG. 3. A compiler construct is a declaration, statement, function, attribute, etc. recognized by a compiler. Alternatively, different compiler constructs can convey event programming information.

Event Source Compiler Constructs

Table 1 presents the event source compiler constructs of the illustrative embodiment.

TABLE 1

Constructs for sourcing events

| Construct | Syntax | Semantic |
| --- | --- | --- |
| [event_source] attribute | [event_source (type = <mode1>)]; | Marks a class as an event source. |
| _event declaration | _event <desc>; | Declares one event. |
| _raise statement | _raise <id> ([<actual arg list>]); | Raises an event. |

[event_source]

An "event_source" attribute is an attribute for a class, and specifies that the class will be an event source using the UEPM. The "event_source" attribute is delimited by brackets "[" and "]" and has a type parameter. The type parameter can have a value native, COM, or COM+ (the value is case insensitive), indicating a specific eventing protocol to follow when implementing the class. The default value for the type parameter is native, unless the class is managed, in which case the default is COM+. A COM+ event source must be managed. In alternative embodiments, another form of programming construct indicates which eventing protocol to follow when implementing an event source class.

_event Declaration

The "_event" keyword begins an event declaration, where the body of the declaration is a description "<desc>" of the actual event. The eventing protocol for the event source class constrains the form of this description. For a native event, the declaration is a method declaration, while for a COM event, the declaration is an interface declaration. For a COM+ event, the declaration can be for a data member or a method, and the type of the COM+ event is a delegate (a COM+ delegate or a type derived from "System::Delegate" or "System::MulticastDelegate"). A COM+ event data member must have its COM+ delegate type pre-defined, but a COM+ event method implicitly defines the corresponding COM+ delegate if it is not already defined. For a COM+ event data member, a COM+ delegate type defines how to raise the event through an Invoke method.

For the "_event"-declared method, an implementation is generated that activates hooked event handlers through corresponding nodes. Thus, the event method is called in the event source as if it were an ordinary member function, and this results in a call to hooked event handlers according to a specific eventing protocol. For a COM event, an interface named in an event declaration requires the interface definition language information for the interface.

The parameters of an event method should be "in" parameters because "out" parameters are uninformative when multicasting. A native or COM event has a return type that is usually "HRESULT" or "void," but can be any integral type, including "enum." When an integral return type is used, an error is defined to be any non-zero value. The return type of a COM+ event handler method is "void," but can be any type for singlecast events.

In alternative embodiments, another form of programming construct specifies an event for an eventing implementation.

_raise Statement

The "_raise" keyword begins a statement, where the body of the statement is a previously declared event "<id>" along with arguments. The body of the statement is an invocation of an event method/member or a method in an event interface, with any required arguments. The "_raise" keyword emphasizes semantics at a call site, but is optional. Simply calling an event method or data member also fires the event. With COM events, the methods corresponding to an "_event" interface declaration may be called with the prefix "interfacename_" to disambiguate methods with identical names and signatures in different event source interfaces. A COM+ event data member can be "called" as if it were the "Invoke" method of the corresponding delegate. (To allow such a call to a COM+ event data member, adjustments to the parse tree are made at the call site.)

In alternative embodiments, another form of programming construct specifies a firing action for an event.

In the case of an error, the event being raised aborts calls to other event handlers. With COM+ events, exceptions are the error handling technique. If a delegate throws an exception, then "_hook" will throw an exception. Otherwise, errors are handled by checking the return value at the node, where an error is defined to be any non-zero value.

Event Receiver Compiler Constructs

Table 2 presents the event receiver compiler constructs of the illustrative embodiment.

TABLE 2

Constructs for receiving events

| Construct | Syntax | Semantic |
| --- | --- | --- |
| [event_receiver] attribute | [event_receiver (type = <mode1>)]; [event_receiver (type = com, layout_dependent = <mode2>)]; | Marks a class as a receiver for events of the specified type. |
| _hook( ) function | long_hook(<id1>, <id2>, <id3>[, <id5>]); long_hook(<id4>, <id2>[, <id5>]); | Registers a handler to be called when the event source fires the event. |
| _unhook( ) function | _unhook(<id1>, <id2>, <id3>[, <id5>]); _unhook(<id4>, <id2>[, <id5>]); _unhook(<id2>[, <id5>]); | Unregisters a handler from being called when the event source fires the event. |

[event_receiver]

The "event_receiver" attribute is an attribute for a class, and specifies that the class will receive events of the specified type using the UEPM. The "event_receiver" attribute takes a type parameter that can have a value native, COM, or COM+, indicating the specific eventing protocol to follow when hooking to events for the class. The default value for the type parameter is native, unless the class is managed, in which case the default is COM+. A COM+ event receiver must be managed. In alternative embodiments, another form of programming construct indicates which eventing protocol to follow when implementing an event receiver class.

If the "event_receiver" type is COM, the value of the "layout_dependent" parameter is considered. If the "layout_dependent" parameter is "true," the names and signatures of the event handlers for the event receiver exactly match the events they are hooked to in the event source. When the "layout_dependent" parameter is "false," the name, calling convention and storage class (virtual, static, etc.) can be mixed and matched between the firing event and the hooked event handler. Having the "layout_dependent" parameter equal "true" slightly increases efficiency but decreases flexibility for the event receiver. The default for the "layout_dependent" parameter is "false."

Instead of specifying a single type, the type parameter for the "event_receiver" attribute can specify multiple types or even "all" types. If so, the compiler generates protocol-specific code for particular "_hook" and "_unhook" functions based upon the type of the event source being hooked. For example, to hook a COM event, the compiler generates COM eventing protocol code.

_hook( )

The "_hook" function registers one or more handlers with an event source. The "_hook" function supports hooking multiple local handlers to a single event and hooking multiple events to a single local handler. A non-zero return value (an "HRESULT" for COM) indicates that an error has occurred. A COM+ event will throw an exception.

The "_hook" function has two forms. In the first form, the "_hook" function registers a specified handler "<id3>" to be called when the event source "<id2>" fires the event "<id1>." The argument "<id1>" identifies the event, and has a type that depends on the eventing protocol for the event. For a COM event, the type of "<id1>" is an interface method or a pointer to an interface method. For a COM+ event, the type of "<id1>" is a data member/method of an event source class or a pointer to a data member/method of an event source class. For a native event, the type of "<id1>" is a method or pointer to a method in an event source class. The argument "<id2>" identifies the event source object. It can be an IUnknown based pointer for a COM event source, a COM+ object pointer for a COM+ event source, or a regular object pointer for a native event source. The argument "<id3>" identifies the event handler, and can be an event handler or pointer to an event handler. The optional argument "<id5>" specifies a pointer to the event receiver, and defaults to a "this" pointer. For a COM event receiver with the "layout_dependent" parameter equal "false," events for individual methods of an interface can be fired before all methods of the interface are hooked up.

The second, two-argument form of the "_hook" function (used for a COM event receiver with the "layout_dependent" parameter "true") hooks up the whole interface "<id4>" to be called when the source object "<id2>" fires any event on the interface.

In alternative embodiments, another form of programming construct specifies a hooking action for an event handler and event source.

_unhook( )

The "_unhook" function unregisters one or more handlers from an event source. A non-zero return value (an "HRESULT" for COM) indicates that an error has occurred. A COM+ event will throw an exception.

The "_unhook" function has three forms. In the first form, the "_unhook" function unregisters a specified handler "<id3>" from a specified event "<id1>" of an event source "<id2>," optionally identifying the event receiver "<id5>." The second, two-argument form of the "_unhook" function is used for a COM event receiver (optional "<id5>") to unregister an entire event interface "<id4>" from an event source "<id2>." The one-argument form of the "_unhook" function unhooks all event handlers of the event receiver (optional "<id5>") from the specified event source "<id2>." Like the argument types for the "_hook" function, the argument types for the "_unhook" function vary depending on the eventing protocol being used. In alternative embodiments, another form of programming construct specifies an unhooking action for an event handler and event source.

IV. Programming Environment

Figure 4:
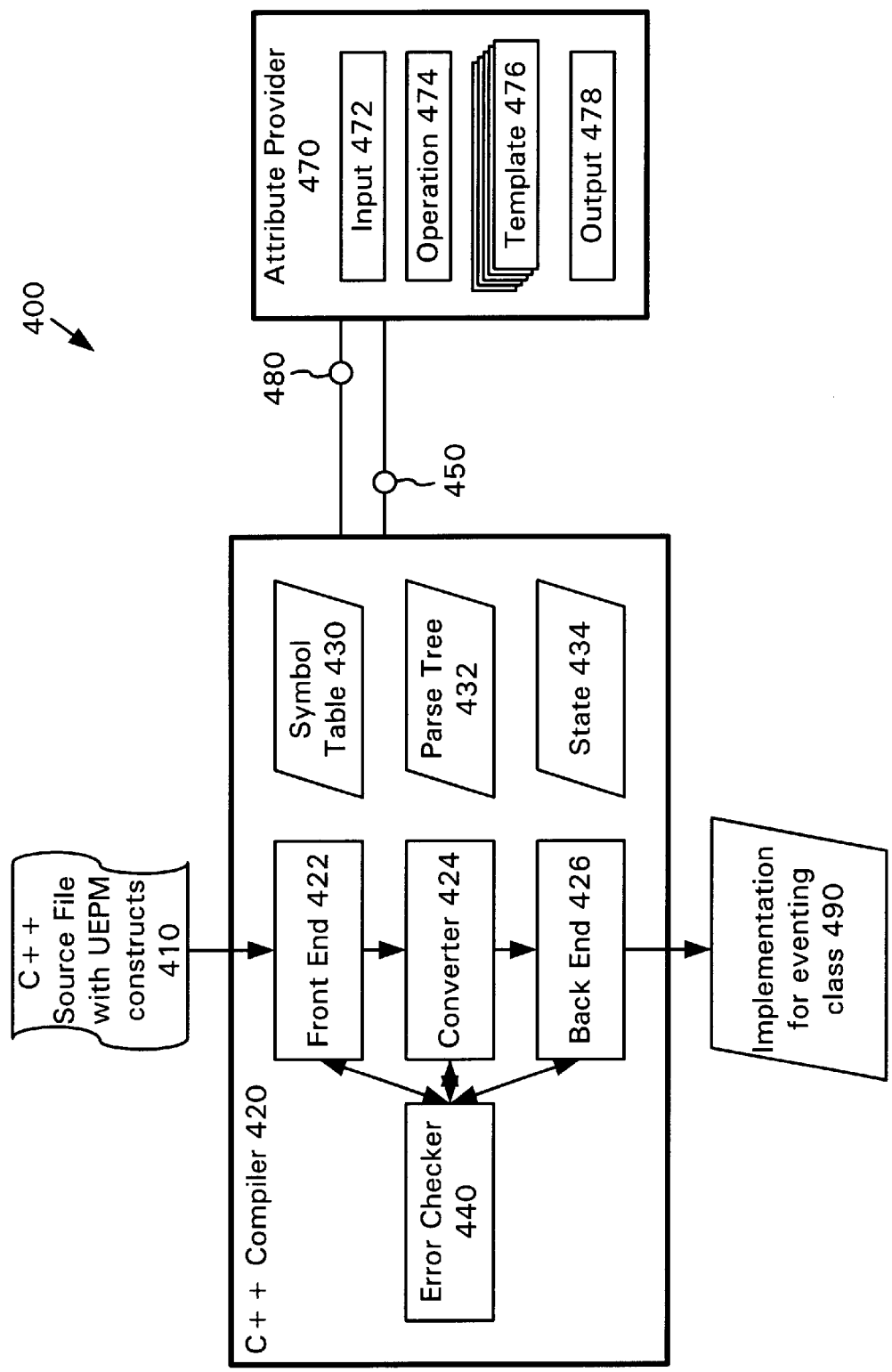
FIG. 4 is a block diagram of a C++ compiler that recognizes a set of uniform constructs for eventing and generates appropriate protocol-specific eventing code for a class.

FIG. 4 shows a block diagram of a compiler environment 400 used to generate event class implementations according to the illustrative embodiment. The compiler environment 400 includes a compiler 420 that accepts C++ code with UEPM constructs 410 as input, and produces an implementation 490 for an event receiver class or event source class as output. In alternative embodiments, another type of programming environment is used to generate protocol-specific event class implementations. For example, in one alternative embodiment, a Java compiler environment facilitates creation of eventing code for a Java event source or event receiver (e.g., event listener) based upon uniform Java event programming constructs, which can be used to program events according to any of multiple Java eventing protocols.

Compiler Environment

Tools in the compiler environment 400 recognize constructs in C++ source code, create a representation in a parse tree, and derive semantic meaning from the constructs in the C++ source code. The compiler environment 400 also provides error detection for the code 410. For example, at compile time, the compiler verifies the existence of events and checks parameter types with specified event handlers for "__hook" and "__unhook" functions. This type checking for event signatures at compile time eliminates expensive run time type checking. Type checking at compile time also simplifies debugging compared to run time techniques.

The compiler environment 400 includes a C++ compiler 420 that accepts as input a file 410. The file includes C++ source code with UEPM constructs, where a construct is an attribute, a keyword, a declaration, a statement, a function, etc. The C++ code includes constructs and parameters for the UEPM along with code for the class and methods of the class. The compiler environment 400 processes the file 410 in conjunction with one or more attribute providers 470, as appropriate injecting protocol-specific code for UEPM constructs. Although FIG. 4 depicts a single attribute provider 470, the compiler 420 can work with multiple attribute providers (e.g., different providers for different constructs). Alternatively, the functionality of the provider 470 can be merged with the compiler 420.

Compiler

A front end module 422 reads and performs lexical analysis upon the file 410. Basically, the front end module 422 reads and translates a sequence of characters in the file 410 into syntactic elements, or "tokens," indicating constants, identifiers, operator symbols, keywords, punctuation, etc.

A converter module 424 parses the tokens into an intermediate representation. For tokens from C++ source code, the converter module 424 checks syntax and groups tokens into expressions or other syntactic structures, which in turn coalesce into statement trees. Conceptually, these trees form a parse tree 432. As appropriate, the converter module 424 places entries into a symbol table 430 that lists symbol names and type information used in the file 410 along with related characteristics. A symbol table entry for a particular symbol can have a list of IDL attributes associated with it.

The converter module 424 determines what must be done to implement constructs such as declarations, statements, and functions of the UEPM. The converter module identifies locations where code is to be injected, or where other operations are to be carried out. "Injected code" typically includes added statements, metadata, or other elements at one or more locations, but this term also includes changing, deleting, or otherwise modifying existing source code. Injected code can be stored as one or more templates, or in some other form. Microsoft Corporation's Active Template Library ["ATL"] provides templates that can be used to generate code. In addition, parse tree transformations may take place, such as altering the list of base classes or renaming identifiers. Injected code is typically located remotely from where the construct specifying it appears in the C++ source code. Code can be injected at multiple locations as well. To clarify the significance of the injected code, comments around the injected code can identify the attribute for which it was injected.

A state 434 tracks progress of the compiler 420 in processing the file 410 and forming the parse tree 432. For example, different state values indicate that the compiler 420 has encountered an attribute, is at the start of a class definition or a function, has just declared a class member, or has completed an expression. As the compiler 420 progresses, it continually updates the state 434. The compiler 420 may partially or fully expose the state 434 to an outside entity such as the provider 470, which can then provide input to the compiler 420.

Based upon the symbol table 430 and the parse tree 432, a back end module 426 translates the intermediate representation of file 410 into output code. The back end module 426 converts the intermediate representation into instructions executable in a target processor, into memory allocations for variables, and so on. As appropriate, the back end module generates code for implementing events as specified with UEPM constructs. Detailed examples of code generated by a compiler are presented below for each of the eventing protocols of the illustrated embodiment. In FIG. 4, the output code is executable in a real processor, but in alternative embodiments the output code is executable in a virtual processor.

The front-end module 422 and the back-end module 426 can perform additional functions, such as code optimization, and can perform the described operations as a single phase or multiples phases. Except as otherwise indicated, the modules of the compiler 420 are conventional in nature, and can be substituted with modules performing equivalent functions.

Attribute Provider

In FIG. 4, the provider 470 indicates how to integrate tokens for attribute constructs into the intermediate representation, for example, adding attributes to a symbol table entry for a particular symbol or manipulating the parse tree 432. Thus, the attribute provider can modify the intermediate representation to integrate protocol-specific code for the event source or event receiver.

In FIG. 4, the provider 470 is external to the compiler 420, and communicates with the compiler 420 across the interfaces 450 and 480. FIG. 4 depicts a simplified interface configuration of the interface 450 exposed by the compiler 420 and the interface 480 exposed by the provider 470. Alternative interface configurations are possible.

The provider 470 includes several modules. An input module 472 receives a particular attribute from a tag and parses it for parameters, values, properties, or other specifications. The interfaces 450 and 480 define how this information is passed between the compiler 420 and the provider 470.

An operation module 474 determines what must be done to implement the attribute, and identifies locations where code such as ATL template code is to be injected, or where other operations are to be carried out. In addition, parse tree transformations may take place, such as altering the list of base classes or renaming identifiers.

An output module 478 communicates back to the compiler 420 to effect changes based upon the attributes. In FIG.

4, the output module 478 directly manipulates internal compiler structures such as the symbol table 430 and the parse tree 432, creating symbols, adding to the parse-tree, transforming the parse tree, etc. Alternatively, the output module 478 writes injected code to an external file (not shown) or send code directly to the compiler 420 as a stream of bytes (not shown) that the compiler 420 processes. Having an attribute provider instruct the compiler (e.g., at converter module 424) to perform the operations gives a measure of security—the compiler 420 can reject or modify any request that would compromise proper functioning.

As the front end module 422 encounters attribute tags in the file 410, the compiler 420 changes the state 434 appropriately and saves the attribute tags in a list. This list also identifies the location of the provider 470 or any other needed attribute provider, as necessary acquiring location information from a utility such as a registry.

The compiler 420 communicates the state 434 to the provider 470. When the provider 470 detects a point at which it desires to perform an operation, it signals the compiler 420 and effects changes in one of the ways mentioned above. Thus, based upon the semantics of the "event_source" or "event_receiver" attribute, the provider 470 affects the states and structures of the compiler 420.

Error Checker

At various points during the processing of the file 410, an error checker module 440 checks for errors. In conjunction with the front end module 422, the error checker module 440 detects errors in lexical structure of C++ source code tokens. With converter module 424, error checker 440 detects any syntactical errors in the organization of C++ source code tokens. The error checker module 440 can also flag certain semantic errors in the C++ source code.

Processing C++ Source Code with UEPM Constructs

Figure 5:
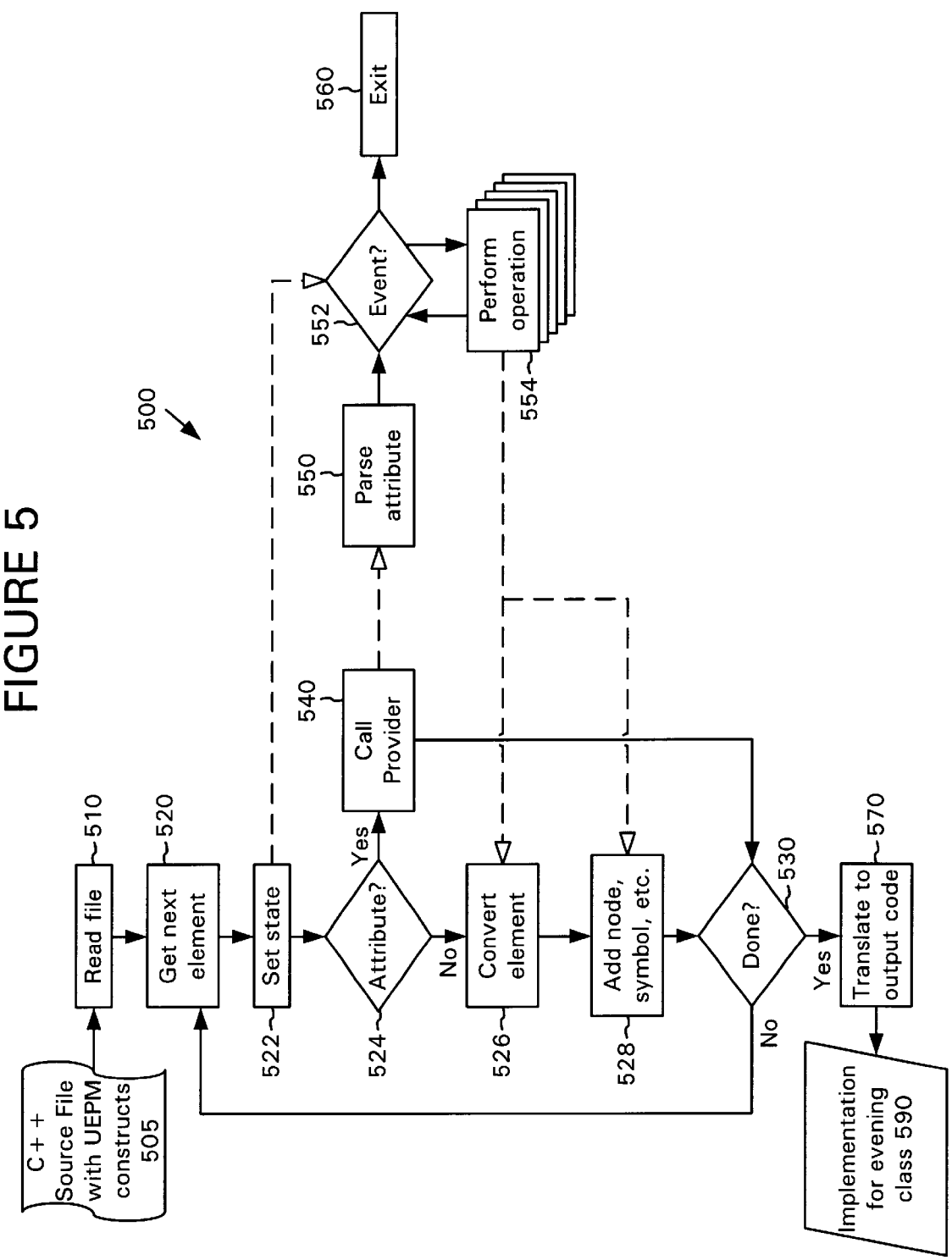
FIG. 5 is a flow chart showing generation of a protocol-specific eventing protocol class by the compiler of FIG. 4.

FIG. 5 shows a technique 500 for processing C++ source code with UEPM constructs in a compiler environment such as that shown in FIG. 4. Alternatively, technique 500 can be performed by a different configuration of modules.

After a compiler reads in (act 510) the file 505, the elements of the file 505 are processed. The compiler gets (act 520) a syntactic element of the file 505 and sets (act 522) an appropriate state for that element. The compiler determines (act 524) whether that element is for a C++ construct (e.g., "__event," "__raise," "__hook," "__unhook") or an attribute (e.g., "__event source," "event_receiver").

If the current element is for a C++ construct, the compiler converts (act 526) that element into an intermediate language. As appropriate, the compiler handles (act 528) the element, for example, by placing a node in the parse tree, adding an entry to the symbol table, injecting code, or transforming the parse tree. If the compiler determines (act 530) that the file 505 includes more elements, the compiler proceeds with the next element.

If the current element is for an attribute, the compiler gets attribute information. The compiler calls (act 540) an attribute provider, transmitting any parameters or other data accompanying the attribute in the construct. The attribute provider parses (act 550) the passed attribute information.

The attribute provider executes concurrently with the compiler, and more than one attribute provider can be active and executing concurrently during compilation. The attribute provider is loaded upon encountering the first attribute, and stays loaded for the duration of the compile operation. In this way, the attribute provider acts as a domain-specific compiler plug-in that is called to parse constructs that are "registered" as part of its domain.

While executing concurrently with the compiler, the attribute provider detects (act 552) the occurrence of designated events within the compiler, for example, events related to the state of compilation (in FIG. 5, represented by a dashed arrow from act 522 to act 552). The compiler exposes a compilation state to the attribute provider. Examining the state, the attribute provider determines whether to do nothing or to perform (act 554) an operation. Thus, the attribute provider can wait until the compiler reaches a certain state, and then perform an operation when that state is reached, for example, requesting the compiler to modify the parse tree. The attribute provider then waits for another event.

The attribute provider can perform different operations for different events that might occur within the compiler, and for different parameters transmitted with an attribute. Among these operations are injection of statements or other program elements, possibly employing templates, and modifying or deleting code. Other operations include adding new classes, methods and variables, or modifying existing ones. Modification can include renaming and extending an object or construct. In FIG. 5, dashed arrows from act 554 to acts 526 and 528 represent the passing of code, state information, instructions, or other data to the compiler as described above.

The scope of an attribute is not bound to the scope of its associated C++ construct. Rather, the scope of an attribute can extend beyond the point of its use. In most cases, however, an attribute affects semantics in the context of its associated C++ construct.

When the file 505 has been completely processed, the compiler translates (act 570) the intermediate representation into a dispatch interface implementation 590. When the compiler finishes the compile operation, the attribute provider exits (act 560).

Although FIG. 5 depicts acts in a particular order, per conventional compiler techniques, many of these acts can be rearranged or performed concurrently. For example, the acts of reading the file, getting elements, determining significance, and translating to output code can be overlapped to some extent.

Generating Protocol-Specific Class Implementations

Figure 6B:
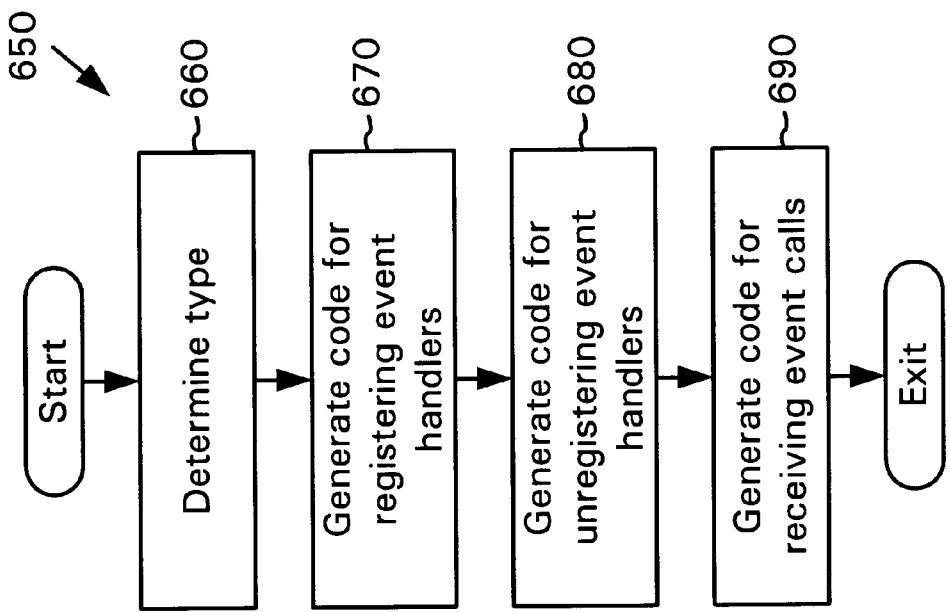
FIGS. 6a and 6b are flow charts showing techniques for generating protocol-specific event classes from protocol-independent event programming constructs.
Figure 6A:
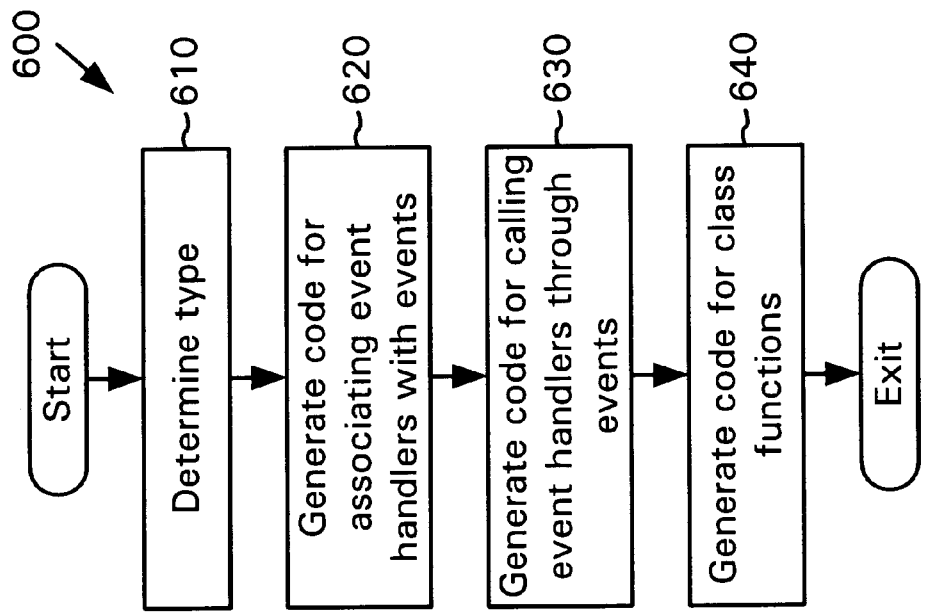

FIG. 6a shows an overall technique 600 for generating a protocol-specific event source class implementation from UEPM constructs, while FIG. 6b shows an overall technique 650 for generating a protocol-specific event receiver class implementation. The techniques 600 and 650 can be followed to produce native, COM, or COM+ eventing implementations (as detailed below). Alternatively, the techniques 600 and 650 can be followed to produce eventing implementations for other object models and eventing protocols.

Generating a Protocol-Specific Event Source Class Implementation

With reference to FIG. 6a, after receiving a file with UEPM constructs that specify an event source, the compiler determines (act 610) the type of the event source. This determination can be based upon a type parameter for an "event_source" attribute or based upon a default value for the object type. Alternatively, the determination can be based upon another form of programming construct that indicates which eventing protocol to follow when implementing an event source class.

The compiler generates (act 620) code for associating event handlers for events, such as code for adding event handlers to a list of hooked event handlers and code for removing event handlers from such a list. The event source type determines the format of the list and code for manipulating the list.

The compiler next generates (act 630) code for calling event handlers when events are fired. When an event method in the event source is raised, this code iterates through the list of associated event handlers and calls those event handlers. The event source type also determines the format with which calls to the event handlers are made.

The compiler then generates (act 640) code for other functions of the event source class. These functions can be for firing a series of events, for example.

Generating a Protocol-Specific Event Receiver Class Implementation

With reference to FIG. 6b, after receiving a file with UEPM constructs that specify an event receiver, the compiler determines (act 660) the type of the event receiver. This determination can be based upon a type parameter for an "event_receiver" attribute or based upon a default value for the object type. Alternatively, the determination can be based upon another form of programming construct that indicates which eventing protocol to follow when implementing an event receiver class.

The compiler generates (act 670) code for registering event handlers with events, such as code for calling a function on the event source for adding an event handler to an event. The compiler next generates (act 680) code for unregistering event handlers from events, such as code for calling a function on the event source for removing an event handler from an event. The code generated in acts 670 and 680 is protocol-specific code for the eventing protocol determined in act 660, unless multiple or all event types are possible, in which case the compiler generates protocol-specific code appropriate for the event source of a particular event.

The compiler then generates (act 690) code for receiving event calls. This code includes the event handler functions that actually process events, and may include various proxy layers and other intervening code.

Although FIGS. 6a and 6b depict acts in a particular order, for different arrangements of UEPM constructs, many of these acts can be rearranged.

V. Function Pointer-Based Eventing Protocol Implementation

A function pointer-based eventing protocol implements an event as a list of pointers to handler functions. The native eventing protocol is a type of function pointer-based eventing protocol. Alternative embodiments support other types of function pointer-based eventing protocols.

The native eventing protocol is the simplest of the three eventing protocols of the illustrative embodiment. A native event source object includes events and exposes methods for manipulating the events. A native event receiver object includes event handler functions. In an event source, an event has a node list that is a list of pointers to event handler functions of receivers.

The native eventing protocol is strongly typed—the signature of an event matches that of its event handler, although the names can differ. The compiler verifies type compatibility at compile time, eliminating the need for run time checking of type compatibility and simplifying debugging.

Figure 8A:
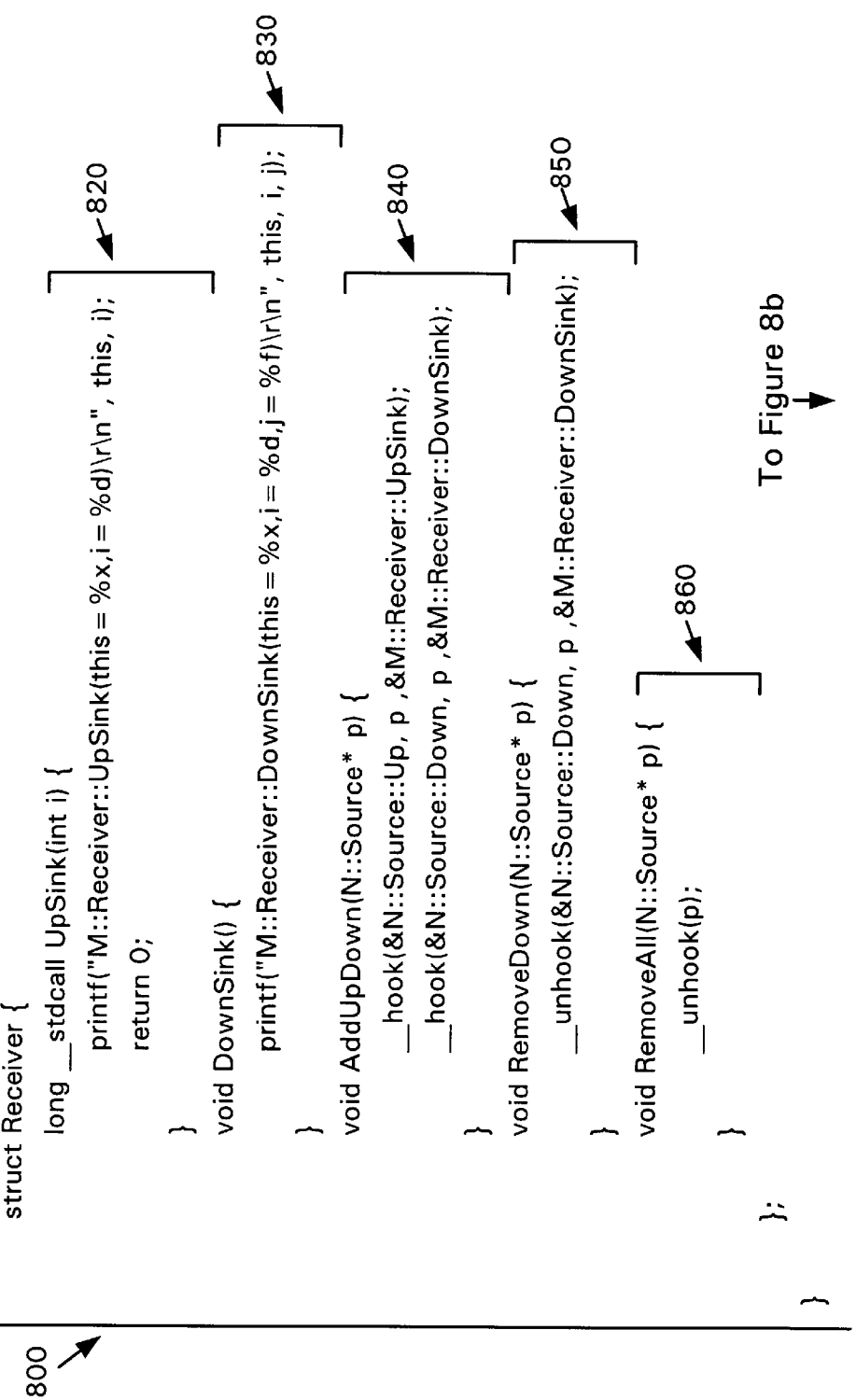
Figure 9:
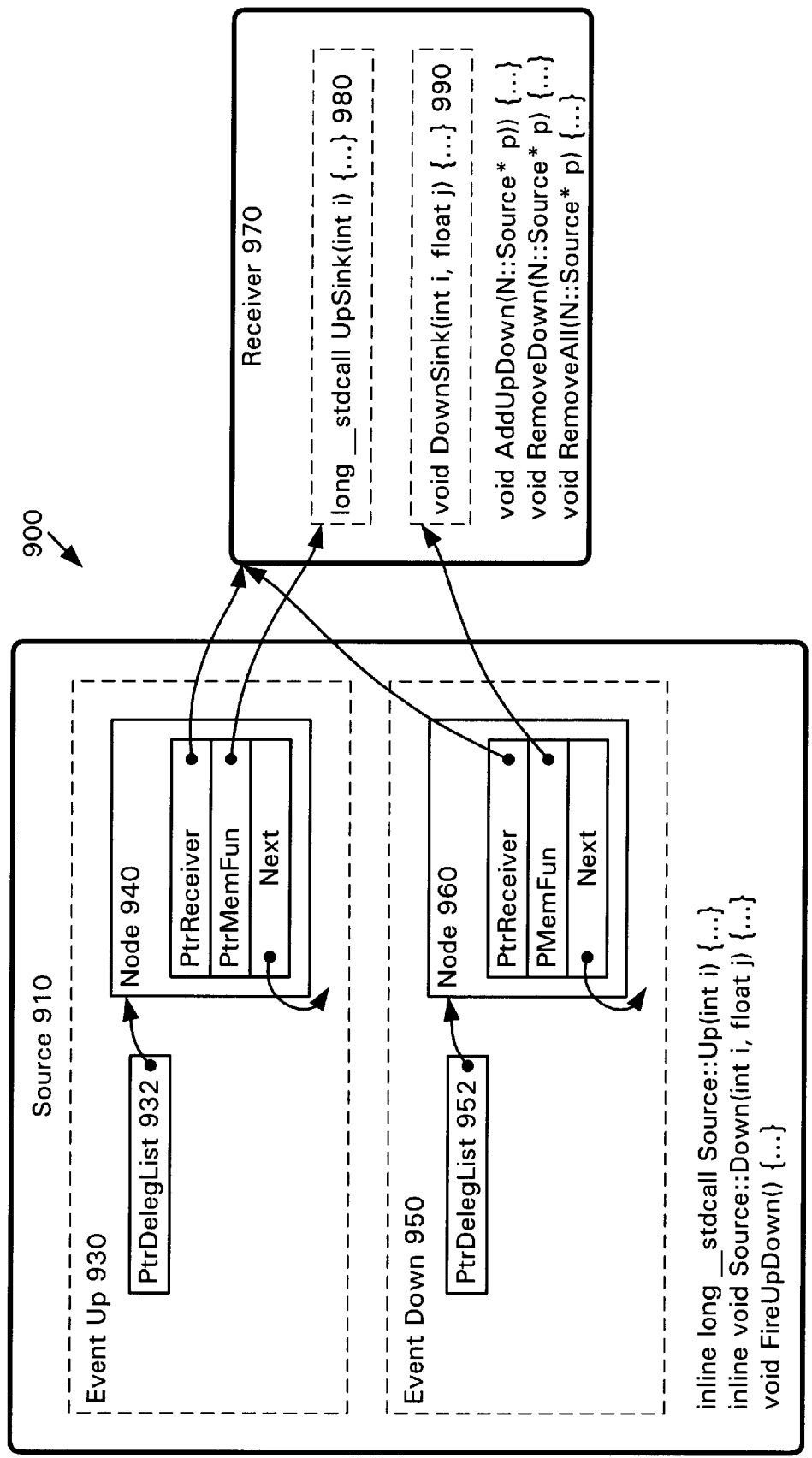
FIG. 9 shows a block diagram of an event receiver object with event handler functions hooked to events of an event source object as described in FIGS. 7, 8a, and 8b.

FIG. 7 shows a source code listing for a native event source class specified with UEPM constructs, while FIGS. 8a and 8b show a source code listing for a native event receiver class. FIG. 9 shows an event receiver object with event handler functions hooked to events of an event source object, as described in FIGS. 7, 8a, and 8b.

Source Code Listing for a Native Event Source Class

FIG. 7 includes a code portion 700 that specifies a native event source from a "struct Source" using UEPM constructs. In code portion 710, the "event1—source" attribute indicates that the "struct Source" will source native events using the UEPM.

In code portion 720, the compiler encounters the "__event" declaration for the event "Up." The compiler marks the symbol corresponding to the "struct Source" as containing native events. In the nearest namespace scope, the compiler inserts code that defines the structure and functions of a node for event "Up." The node stores data representing a pointer to an event receiver, a pointer to a member function, and a pointer to a subsequent node in a linked list.

Nodes can be added or removed from the list to hook or unhook member functions. Each node includes an Invoke method for invoking the event handler function pointed to by the node. For removal operations, each node includes an IsEqual function for determining whether the node's receiver and member function pointers are equal to passed in pointers identifying a node(s) that should be removed from the list The compiler also inserts in the nearest namespace scope an inline function for firing event "Up." The event is fired by calling this inline function as if it were an ordinary function. This function iterates through the node list, calling the Invoke method of each node in the list, which in turn dereferences the receiver and member function pointers for a call to the event handler function.

In the member scope of the "struct Source," the compiler inserts a declaration that initializes a pointer to the node list for event "Up." The compiler also inserts a function "__AddEventHandler_Source_Up" for adding an event handler to the node list, a function "__RemoveEventHandler_Source_Up" for unhooking one specified event handler from the node list, and a function "__RemoveAllEventHandlers_Source_Up" for unhooking all event handlers for a particular receiver from event "Up." These functions are thread safe, using a locking mechanism to synchronize access.

In code portion 730, the compiler encounters the "__event" declaration for the event "Down." The compiler inserts code for the event "Down" that is analogous to the code inserted for the event "Up." The code portion 740 includes code for a method that fires the events.

Alternatively, the compiler performs different operations (e.g., as described in Section IV. Programming Environment) to provide code for implementing eventing for the native event source class. Moreover, instead of providing the code described above with reference to FIG. 7, the compiler can provide equivalent code.

Source Code Listing for a Native Event Receiver Class

FIGS. 8a and 8b include a code portion 800 specifying a native event receiver from a "struct Receiver" using UEPM constructs. The "event_receiver" attribute in the code portion 810 indicates that the "struct Receiver" will receive native events using the UEPM. The code portions 820 and 830 include event handler functions for the events "Up" and "Down," respectively.

When the compiler encounters the "_hook" functions in the code portion 840, the compiler replaces them with calls to "AddEventHandler" methods of an event source. For example, the compiler replaces "_hook(&N::Source::Up, p, &M::Receiver::UpSink)" with "(p)->_AddEventHandler_Source_Up((Receiver*) this, &Receiver::UpSink)."

Similarly, the "_unhook" functions in the code portions 850 and 860 are replaced with calls to "RemoveEventHandler" methods. Thus, the compiler replaces "_unhook(p)" with "(p)->_RemoveAllEventHandlers_Source_Up((Receiver*) this)."

The code portion 870 includes code for creating an event source and an event receiver, hooking up event handler functions in the event receiver to events, firing events, and then unhooking the event handler functions.

Alternatively, the compiler performs different operations (e.g., as described in Section IV. Programming Environment) to provide code for implementing eventing for the native event receiver class. Moreover, instead of providing the code described above with reference to FIGS. 8a and 8b, the compiler can provide equivalent code.

Native Event Source and Receiver Objects

FIG. 9 shows an event source and an event receiver with event handler functions hooked as described in the code portion 870. The event source 910 includes functions and data for the event "Up" 930 and the event "Down" 950. A pointer 932 points to the node list for the event "Up" and a pointer 952 points to the node list for the event "Down."

When the function "AddUpDown" of the event receiver 970 is called, the methods "AddEventHandler_Source_Up" and "AddEventHandler_Source_Down" are called on the event source 910, creating a node 940 associated with the event "Up" 930 for the event handler "UpSink" 980 and creating a node 960 associated with the event "Down" 950 for the event handler "DownSink" 990. The node 940 stores a pointer to the event receiver 970, a pointer to the event handler "UpSink" 980, and a null pointer (since the node list has one node). The node 960 stores a pointer to the event handler "DownSink" 990.

When the method "FireUpDown" of the event source 910 is called, the event source 910 calls the inline functions "Up" and "Down," passing the parameters specified in the method "FireUpDown." The inline functions "Up" and "Down" iterate the nodes of their respective node lists, calling the Invoke method of each of the nodes. Calling the "Invoke" method of the node 940 causes a call to "M::Receiver::UpSink," while calling the Invoke method of the node 960 causes a call to "M::Receiver::DownSink."

When the method "RemoveDown" of the event receiver 970 is called, the event receiver 970 calls the method "RemoveEventHandler_Source_Down" of the event source 910, specifying the event handler "DownSink" 980 method for removal. The "RemoveEventHandler_Source_Down" method calls the "IsEqual" function of the node 960 to determine whether the node 960 should be removed.

A subsequent call to the "FireUpDown" method of the event source 910 results in a successful firing of only the event "Up." A call to the "RemoveAll" method of the event receiver 970, converted to calls to "RemoveAllHandlers_Source_Up" and "RemoveAllHandlers_Source_Down," unhooks the remaining hooked event handler from the event source 910.

VI. Implementation for an Interface-Based Event Source

An interface-based eventing protocol implements an event through interfaces on the event source and event receiver. The COM eventing protocol is a type of interface-based eventing protocol. Alternative embodiments support other types of interface-based eventing protocols.

The COM eventing protocol uses connection point interfaces. An event source object exposes a connection point container interface and exposes a connection point interface for each event. The implementation of an event receiver object depends upon whether the layout of the event receiver interface matches the event interface in the event source. If the layout does match, the layout-dependent event receiver passes an interface pointer to a corresponding connection point interface in the event source, which calls the event handler methods through the interface pointer. On the other hand, if the layout does not match, the event receiver uses a proxy interface that simulates the behavior of a layout-dependent event receiver. The implementation of the event source is the same whether the event receiver is layout-dependent or not.

FIGS. 10a–10b and 11 show a source code listing for a COM event source class specified with UEPM constructs. The source code of FIGS. 10a–10b is for a header file that is used in conjunction with the COM event receiver classes as well. In alternative embodiments, the compiler receives this information by another mechanism, such as an imported type library.

Source Code Listing for a Header File

FIGS. 10a and 10b show a code portion 1000 that contains COM boilerplate code for a "struct CSource," definitions for user-defined types, and definitions for interfaces. The interface "IEvent" (defined in code portion 1010) is a dispatch interface with methods "Grade" and "Score," while the interface "IEvent2" (defined in code portion 1020) is a standard COM interface with methods "Display," "Grade," and "Score." The interface "N::IJW" (defined in code portion 1030) is a dual interface with a method "Grade." Methods named "Grade" appear in all three defined interfaces, and have the same invocation signature in "IEvent2" and "N::IJW." The code portion 1040 defines a method "FireSome" of a dual interface "IBase."

The code portion 1000 includes embedded interface definition language ["IDL"] information defining the user-defined types as well as the interfaces. Embedded IDL constructs are delimited by brackets. The compiler uses this IDL information when injecting code. The code portion 1000 includes user-defined types "enum E" and "struct S," each annotated with the IDL attribute export. The code portion 1010 includes IDL attributes for the dispatch interface "IEvent," IDL attributes for the member functions of "IEvent," and IDL attributes for function arguments. The code portions 1020, 1030, and 1040 contain embedded IDL information for the interfaces "IEvent2," "N::IJW," and "IBase," respectively.

The "_interface" keyword marks the interface "IEvent." In accordance with COM, the "_interface" keyword semantically is a struct which contains pure virtual function members (virtual function members for which no implementation is specified that must be overridden in a derived class in order to create an object).

Alternatively, instead of embedded COM IDL, definition information is Java IDL information, CORBA IDL information, from a type library, or another type of declarative information that describes an object or an interface of an object.

Source Code Listing for a COM Event Source Class

FIG. 11 shows a code portion 1100 that contains source code for implementing an event source class "CSource." "CSource" is a COM class, as indicated by the IDL attribute coclass in the code portion 1110. This code portion also contains the attribute "event_source(com)," which marks "CSource" as a COM event source under the UEPM.

"CSource" inherits from the interface "IBase," and implements (in code portion 1130) the method "FireSome" that was defined in the code portion 1040. The implementation for the method "FireSome" raises various events of the interfaces "IEvent," "IEvent2," and "N::IJW."

The code portion 1120 includes "__event" declarations for "CSource." As a COM event source, the "__event" declarations each declare an interface as an event. The compiler generates eventing implementations for these interfaces.

The compiler adds to the "struct CSource" a base class for a COM "IConnectionPointContainer" interface implementation. "CSource" then exposes an "IConnectionPointContainer" interface that enables communication with COM event receivers under the COM eventing protocol. For each of the declared event interfaces, the compiler adds an "IConnectionPoint" interface implementation. "CSource" thus exposes a connection point interface for each event interface, where the connection point interface allows a COM event receiver to register an event receiver interface. The connection point interface for the event tracks these registered event receiver interfaces, and calls methods on the registered interfaces when raising events. Inside the member scope of the "struct CSource," the compiler adds support for the "QueryInterface" method of the connection point container interface. The "QueryInterface" method can then return a connection point interface when queried by an event receiver that identifies a particular connection point interface.

The compiler then adds code for the member functions of the event interfaces. These member functions were defined in the code portion 1000, but not implemented. For each member function, the compiler adds code for firing the member function. When the member function is called, the function iterates through the list of registered event receivers in the connection point interface for the event. On each registered event receiver interface, the event handler method corresponding to the fired event member function is called.

Alternatively, the compiler performs different operations (e.g., as described in Section IV. Programming Environment) to provide code for implementing eventing for the COM event source class. Moreover, instead of providing the code described above with reference to FIG. 11, the compiler can provide equivalent code.

COM Event Source Object

Figure 12:
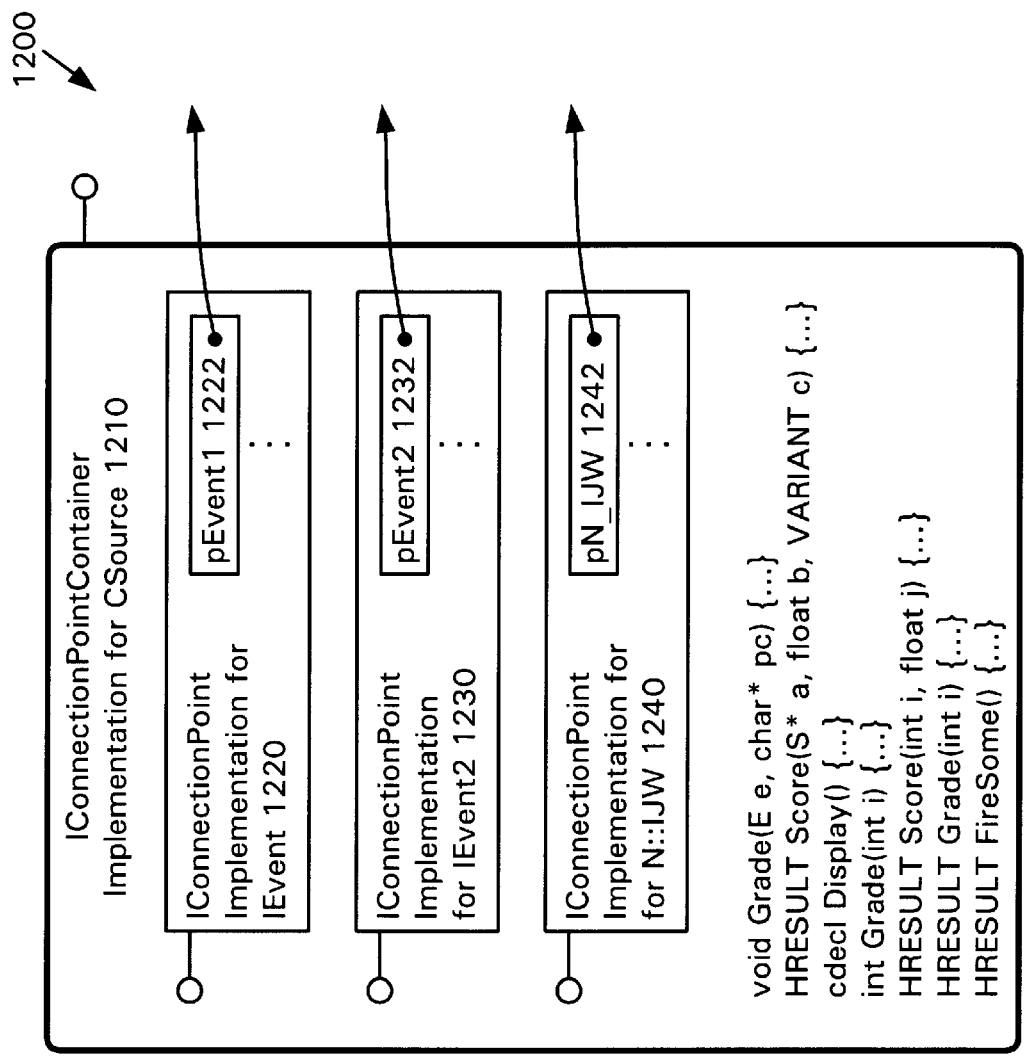
FIG. 12 shows a block diagram of a COM event source object as described in FIG. 11.

FIG. 12 shows an event source 1200 as described in FIGS. 10a–10b and 11. The event source 1200 includes IConnectionPointContainer implementation code 1210 and an eventing implementation for each of the methods of the event interfaces.

IConnectionPoint implementation code 1220, 1230, and 1240 provides a connection point for each of the declared event interfaces of the event source 1200. The pointer 1222 points to an event receiver interface hooked up to the connection point for the declared event interface "IEvent." Whenever a method of "IEvent" is called, a corresponding method of the registered event receiver interface is called through the "IConnectionPoint" interface and the pointer 1222. The pointers 1232 and 1242 are pointers to event receiver interfaces hooked to "IEvent2" and "N::IJW," respectively.

VII. Implementation for a Layout-Dependent Interface-Based Event Receiver

If the "layout_dependent" parameter of the "event_receiver" attribute is "true," the names and signatures of the event handlers for the event receiver exactly match the events they are hooked to in the event source. The layout-dependent event receiver passes an interface pointer to a corresponding connection point interface in the event source, which calls the event handler methods through the interface pointer.

Source Code Listing for a Layout-Dependent COM Event Receiver Class

FIG. 13 shows a source code listing 1300 for a COM event receiver class "CSink" specified with UEPM constructs. The code portion 1310 contains the "event_receiver" attribute, with parameters "com" and "true," which indicate "CSink" is a layout-dependent COM event receiver under the UEPM. When the compiler encounters the "event_receiver" attribute, the compiler adds a base class to the "struct CSink" from an ATL template. This template provides a mechanism to simulate a list of pointers to member functions of native events, and includes methods "__Advise" and "__Unadvise" for adding and removing from the simulated list.

The ATL template includes code defining an "event cookie node" structure that stores information about an event source object and event interface hooked to "CSink." A list of these node structures tracks the event interfaces to which "CSink" is hooked. The ATL template initializes the list of event cookie nodes to null.

The method "__Advise" takes as arguments a pointer to a COM event source object, an IUnknown-based pointer for "CSink," and an identifier, or cookie, of the event interface to be hooked on the event source object. With reference to the list of event cookie nodes, the method determines whether the event interface of the event source is already present in the list, yet unhooked. If it is not present, a corresponding new event cookie node is added to the list. In any case, a call to an ATL provided connection point "Advise" function hooks "CSink" to the specified event interface of the specified event source object.

The method "__Unadvise" takes as arguments a pointer to a COM event source object and an identifier of the event interface to be unhooked. The method removes (in reverse order, if there is more than one occurrence) the specified event interface from the list of event cookie nodes and unhooks "CSink" from the identified event interface through an ATL provided connection point "Unadvise" function.

"CSink" inherits from the interface "IEvent," which was defined in the code portion 1000 of FIGS. 10a–10b. "CSink" includes event handler function implementations for the methods "Grade" and "Score" of "IEvent" in code portions 1320 and 1330, respectively. Because "CSink" is layout-dependent, the methods "Grade" and "Score" must be implemented exactly as specified in the interface, i.e., the names and signatures of the methods "Grade" and "Score" match those defined for the interface "IEvent."

The code portion 1340 includes code for hooking to the "IEvent" interface of a specified event source object at "pS." The compiler converts the "__hook" function in the code portion 1340 to "Advise(pS, (this)-→GetUnKnown( ), __uuidof(IEvent))."

The code portion 1350 includes code for unhooking from the "IEvent" interface of the event source object at "pS." The compiler converts the "__unhook" function in this code portion to "__UnAdvise(pS,__uuidof(IEvent))."

Alternatively, the compiler performs different operations (e.g., as described in Section IV. Programming Environment) to provide code for implementing eventing for the layout-dependent COM event receiver class. Moreover, instead of providing the code described above with reference to FIG. 13, the compiler can provide equivalent code.

Layout-Dependent COM Event Receiver Object

Figure 14:
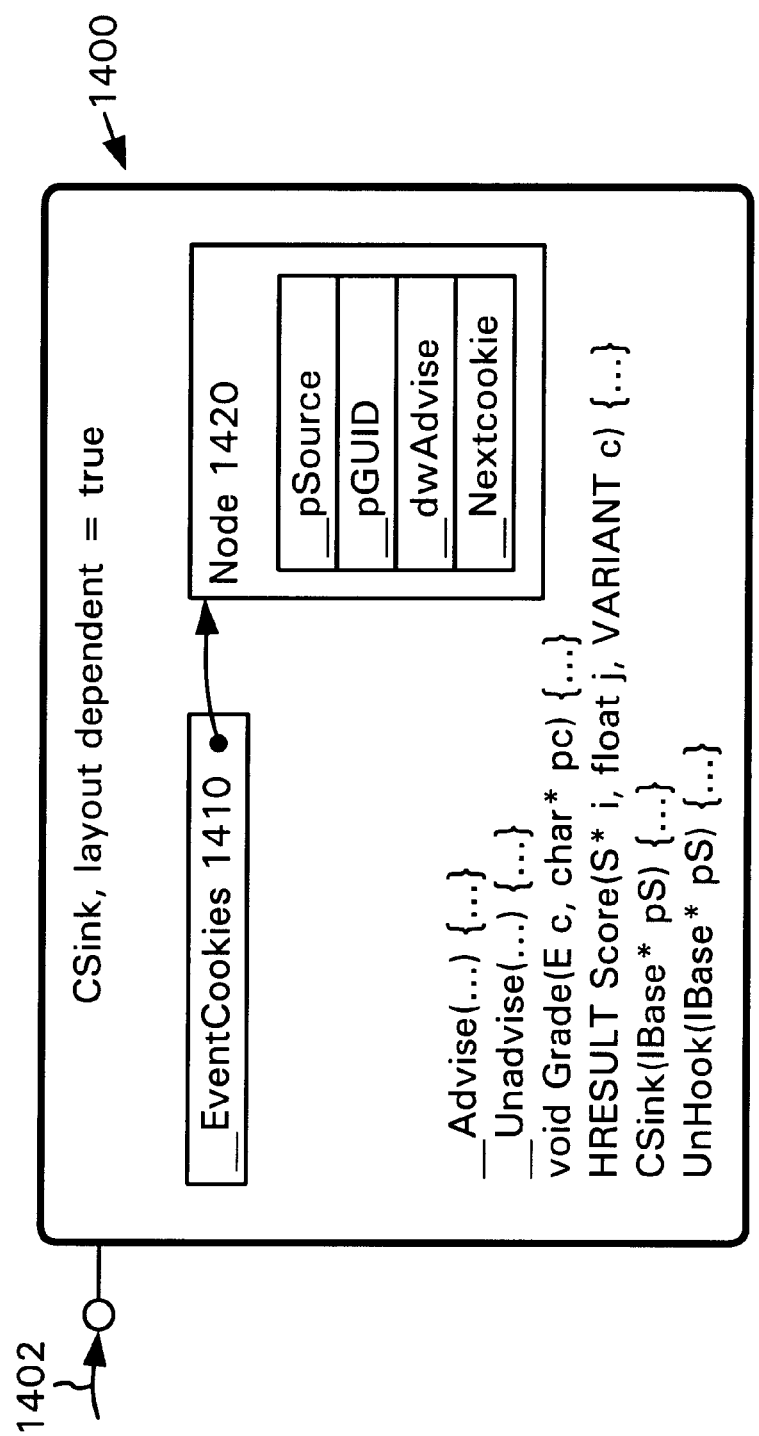
FIG. 14 shows a block diagram of a COM event receiver object as described in FIG. 13.

FIG. 14 shows an event receiver 1400 as described in FIG. 13. The event receiver 1400 includes injected methods "__Advise" and "__Unadvise" as well as layout-dependent event handler function implementations for the methods "Grade" and "Score."

The event receiver 1400 includes a pointer 1410 to a list of event cookie nodes. Reflecting an initial call to the method "CSink," the event receiver 1400 is hooked to an event source object that fires the "IEvent" interface. Accordingly, the event source object holds an interface pointer 1402 to the event receiver 1400. A node 1420 in the list of event cookie nodes stores a pointer to the event source object, an identifier (GUID) of the "IEvent" interface, a cookie indicating the identity of the hooked event interface, a field "__dwAdvise" indicating whether the event source is already hooked, and a null pointer (no subsequent nodes in FIG. 14).

When the method "Grade" on "IEvent" is raised, the event source object calls the corresponding event handler function through the event receiver interface pointer 1402 that the event source object holds.

VIII. Implementation for a Layout-Independent Interface-Based Event Receiver

A layout-independent event receiver uses event proxies that act as layout-dependent intermediaries between the layout-independent interface-based event receiver and interface-based event sources. When an event is fired on an interface-based event source, the corresponding method on the event proxy is called. This method, in turn, calls an event handler proxy method of the event receiver. The event handler proxy method associates the fired event with the correct event handler of the event receiver.

Source Code Listing for a Layout-Independent COM Event Receiver Class

FIGS. 15*a*–15*c* show a source code listing for a layout-independent COM event receiver class specified with UEPM constructs. The code portion 1500 contains source code for implementing an event receiver class "CSink." The code portion 1510 contains the "event_receiver" attribute, with type "corn" and a default value of "false" for the "layout__dependent" parameter. These indicate that "CSink" is a layout-independent COM event receiver under the UEPM.

When the compiler encounters the "event_receiver" attribute, the compiler adds a base class to the "struct CSink" from an ATL template. The ATL template provides a proxy mechanism/simulated event interface vtable mechanism, and includes methods "__AddHandler," "__RemoveHandler," and "__RemoveAllHandlers."

ATL Template Code

The ATL template includes code defining a proxy node structure that stores information about an event source object and event interface hooked to the event receiver. Each proxy node structure includes a proxy index that maps method offsets for the vtable of the event interface (and proxy) to method offsets for event handler functions of a simulated vtable of the event receiver. A list of these node structures tracks the event interfaces to which the event receiver is hooked. The ATL template manages this list with three pointers, pointing to the first, last, and a currently active node, respectively. The ATL template initializes the list to null.

The method "__AddHandler" takes as arguments a pointer to an event proxy, a pointer to the event receiver, a method offset for the simulated vtable of the event receiver, a pointer to an event source, a method offset for the actual vtable of the event interface, and a size value for the event interface. A pointer to the proxy node for the event interface is retrieved. As necessary, a new event proxy and proxy node are created. (The list of proxy nodes is searched for a proxy node with specified source and receiver pointers, the correct GUID of the event interface, and an unhooked proxy index. If such a proxy node exists, a pointer to it is returned. If such a proxy node does not exist, then one is added to the list.) With the proxy index of the proxy node, the entry for the specified method of the event interface is set to the specified method offset of the simulated vtable of the event receiver. This associates the method offset in the actual vtable of the event interface (and proxy) with the method offset in the simulated vtable. Then a call to an ATL provided connection point Advise function hooks the event proxy to the specified event interface of the specified event source object.

The method "__RemoveHandler" takes as arguments a pointer to an event proxy, a pointer to the event receiver object, a pointer to an event source object, and a method offset for a method of the event interface. A pointer to the proxy node for the event interface is retrieved. (The list of proxy nodes is searched for a proxy node with specified source and receiver pointers, the correct GUID of the event interface, and a hooked proxy index. If more than one proxy node is found, then the last one found is used.) In the proxy index of the proxy node, the entry for the specified method of the event interface is set to a null value, in effect unhooking an event handler method of the simulated vtable. A call to an ATL provided connection point "Unadvise" function unhooks (in reverse order, if there is more than one occurrence) the event proxy from the specified event interface of the specified event source object.

The method "__RemoveAllHandlers" takes as arguments a pointer to an event source and an event interface identifier. For each proxy node, if the specified event source and event interface match the proxy node's values, the method calls the ATL provided "Unadvise" function and clears the proxy index.

The method "__WhichThis" is called from within the "__AddHandler" and "__RemoveHandler" methods, and retrieves a pointer to a proxy node or, if necessary, creates a new proxy node and event proxy. When hooking, the method "_WhichThis" searches the list of proxy nodes for a proxy node with specified source and receiver pointers, a correct GUID of the event interface, and a proxy index unhooked (_pCurrent->_proxyIndex[idx]==_InvalidIndex). If such a proxy node exists, then a pointer to it is returned. If such a proxy node does not exist, then one is added to the list. When unhooking, the method "_WhichThis" searches the list of proxy nodes for a proxy node with specified source and receiver pointers, the correct GUID of the event interface, and a hooked proxy index (_pCurrent->_proxyIndex[idx]!=_InvalidIndex). If more than one proxy node is found, then the last one found is used.

Event Handler Functions

In FIGS. 15a and 15b, the code portions 1520–1525 contain member functions for the event receiver "CSink." These member functions are event handler functions for interfaces defined in the code portion 1000 of FIGS. 10a–10b. Because the COM event receiver is layout-independent, however, the names of the event handler functions differ from the methods of the event interfaces. Alternatively, the names of the event handler functions can match the names of the method of the event interfaces.

Simulated VTable

The compiler creates a simulated vtable for calling the member functions of the "struct CSink." The simulated vtable works through the methods "_eventHandlerProxy" and "_eventHandlerVProxy." When an event source fires an event method, the event source calls a corresponding method (same offset) on an event proxy. For the proxy node for the event interface, a proxy index lookup yields a method offset for the event handler function in the simulated vtable of the event receiver. When the event proxy calls the method "_eventHandlerProxy," the method "_eventHandlerProxy" handles the arguments for the call and calls the method "_eventHandlerVProxy." The method "_eventHandlerVProxy" simulates a vtable interface, switching on the method offset provided by the proxy index lookup.

Hooking and Unhooking Event Handler Functions

In FIG. 15b, the code portion 1530 contains code for displaying a notification when a specified event handler is hooked to or unhooked from a specified source and event interface using a "_hook" or "_unhook" function passed to another function.

The code portion 1540 contains code for hooking a series of event handler functions of the event receiver to event interface methods of a specified event source at "pS." This code portion uses the syntax of the UEPM. When the compiler encounters a call to the "_hook" function, the compiler generates an event proxy at global scope that implements the specified event interface. The event proxy includes a pointer to the event receiver, a pointer to a proxy node in the event receiver, and implementations for the methods of the specified event interface. Each implementation calls through to the "_eventHandlerProxy" function of the event receiver for the event proxy, passing a proxy index lookup used to map the method offset for the method of the event proxy to a method offset in the simulated vtable of the event receiver.

The compiler converts a "_hook" function call to a call to the

"_AddHandler" method of the event source. For example,

"_hook(&IEvent2::Grade, pS, &CSink::f4)" is converted to

"_AddHandler((_Impl_Event2*) 0, this, 4, pS, 1, 3),"
where: "(_Impl_Event2*) 0" is a pointer to an event proxy for the interface "IEvent2," "this" is a pointer to the event receiver, 4 is the method offset of "f4" in the simulated vtable, "pS" is a pointer to the event source object, 1 is the method offset of "Grade" in "IEvent2," and 3 is the number of custom methods in "IEvent2."

The code portion 1550 contains code for unhooking specified event handlers using the syntax of the UEPM. The compiler converts the "_unhook" function calls to calls to the "_RemoveHandler" method. For example, the compiler converts "_unhook(&IEvent::Grade, pS, &CSink::f2)" to "_RemoveHandler((_Impl_Event*) 0, this, pS, 2)," where 2 is method offset of "f2" in the simulated vtable.

The code portion 1560 contains code for unhooking all event handlers of the event receiver using the syntax of the UEPM. The code portion 1570 contains code for performing a series of actions between an event source and event receiver.

Alternatively, the compiler performs different operations (e.g., as described in Section IV. Programming Environment) to provide code for implementing eventing for the layout-independent COM event receiver class. Moreover, instead of providing the code described above with reference to FIGS. 15a–15c, the compiler can provide equivalent code.

Layout-Independent COM Event Receiver Object

Figure 16:
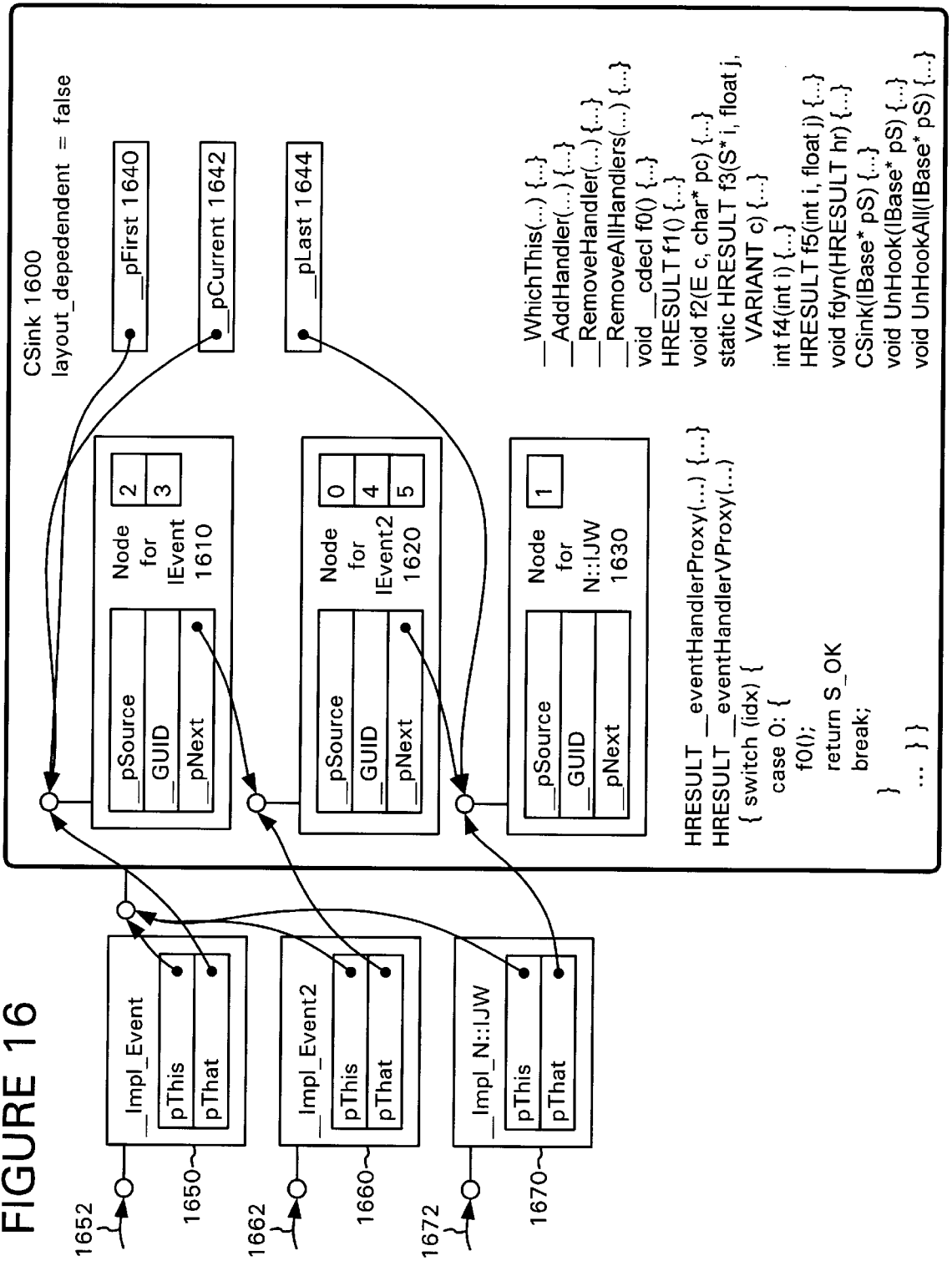
FIG. 16 shows a block diagram of a COM event receiver object as described in FIGS. 15a–15c.

FIG. 16 shows an event receiver 1600 as described in FIGS. 15a–15c. The event receiver 1600 includes event handler implementations for the methods "f0," "f1," "f2," "f3," "f4," and "f5" as well as injected methods "_AddHandler," "_RemoveHandler," "_RemoveAllHandlers," and "_WhichThis." The event receiver 1600 also includes the injected methods "_eventHandlerProxy" and "_eventHandlerVProxy."

FIG. 16 shows the event receiver 1600 after the method "CSink" has been called to hook the event handlers to the event source object at "pS." As such, the event receiver 1600 includes three proxy nodes 1610, 1620, and 1630 as well as the pointers 1640, 1642, and 1644 point to list of nodes.

The first proxy node in the list, the proxy node 1610, includes information for the interface "IEvent." The proxy node 1610 includes a pointer to the event source, an identifier for the interface, and a pointer to the next proxy node in the list. The proxy index for the proxy node 1610 has two entries, one each for the methods "Grade" and "Score" of "IEvent." The first entry holds a value 2, indicating that the event handler function "f2" is hooked to the "Grade" method of the "IEvent" interface of the event source object at "pS." The second entry holds a value 3, indicating that the event handler function "f3" is hooked to the "Score" method of the same interface.

The event proxy 1650 for the "IEvent" interface includes a pointer to the event receiver 1600 and a pointer to the proxy node 1610. The event source holds an interface pointer 1652 to the event proxy 1650. Similarly, the event proxy 1660 implements the "IEvent2" interface and holds pointers to the event receiver 1600 and the proxy node 1620. The event proxy 1670 implements "N::IJW" and holds pointers to the event receiver 1600 and the proxy node 1630. The event source holds interface pointers 1662, 1672 to the respective event proxies 1660, 1670.

When the event source fires an event for the "Score" method of the interface "IEvent," the event source calls a corresponding "Score" method on the event proxy 1650. The event proxy 1650 calls the "_eventHandlerProxy" method of the event receiver 1600, passing a lookup function for the second entry of the proxy index of the proxy node 1610, as well as passing the arguments for the event handler function "f3." In turn, "_eventHandlerVProxy" calls to the event handler function "f3."

X. Delegate-Based Eventing Protocol Implementation

A delegate-based eventing protocol works through delegates that act as intermediaries between an event source and an event receiver. The COM+ eventing protocol is a type of delegate-based eventing protocol. Alternative embodiments support other types of delegate-based eventing protocols.

The COM+ eventing protocol works through delegates that act as intermediaries between a COM+ event source and a COM+ event receiver. A delegate wraps an event handler method for an event receiver object. A multicast delegate keeps a list of multiple event handler methods, and iterates through these event handler methods when called. Conceptually, a delegate is an abstraction of the list of pointers to member functions in the native event source.

For an event, a COM+ event source object holds a reference to a delegate for the event. To fire the event, the COM+ event source calls an "Invoke" method of the delegate, which in turn calls event handlers registered with the delegate. System services provide the functionality for creating delegates, registering event handlers, and unregistering event handlers.

Source Code Listing for a COM+ Event Source Class

Figure 19:
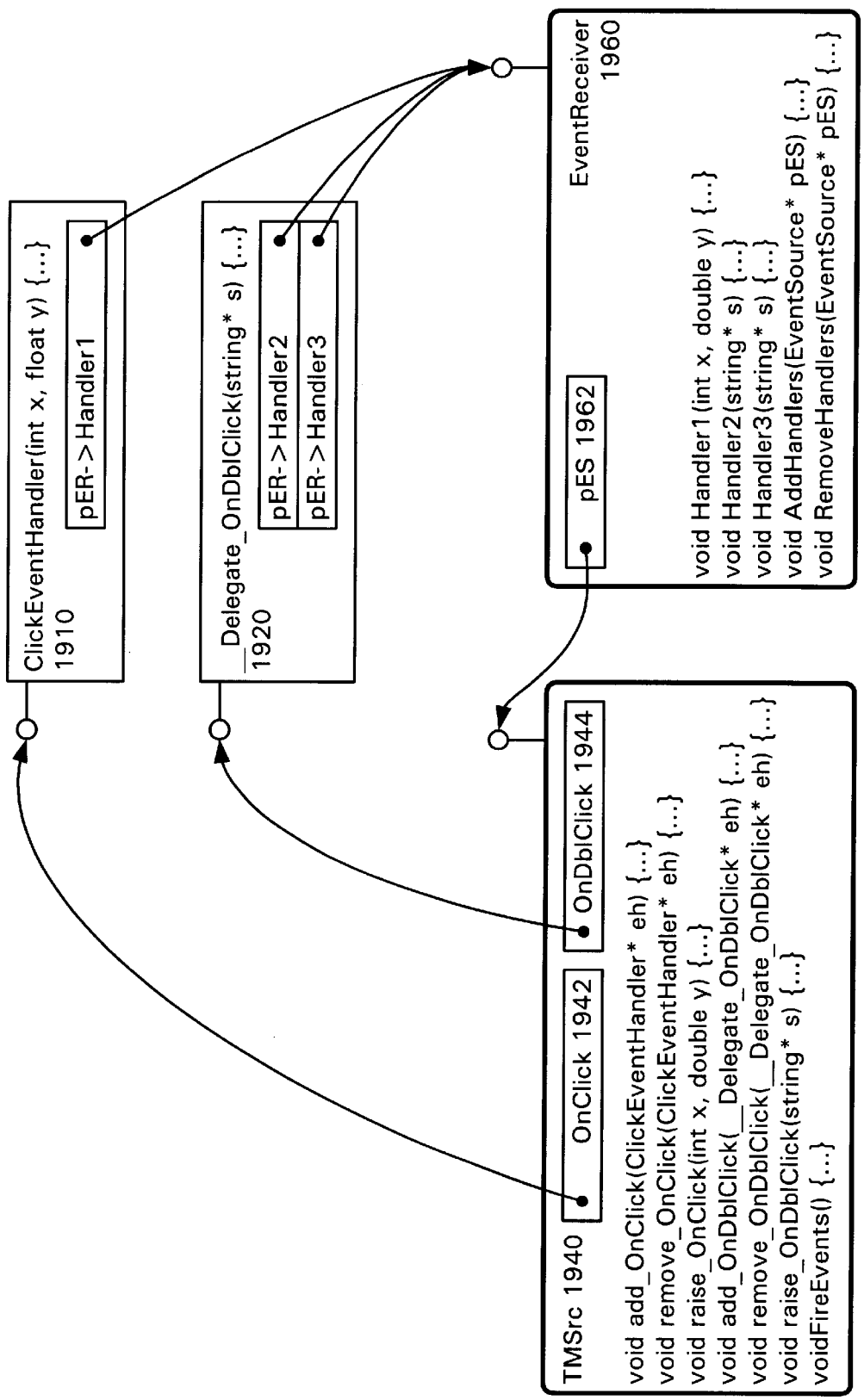
FIG. 19 shows a block diagram of a COM+ event receiver object with event handler functions hooked to events of an COM+ event source object as described in FIGS. 17, 18a, and 18b.

FIG. 17 shows a source code listing for a COM+ event source class specified with UEPM constructs, while FIGS. 18a and 18b show a source code listing for a COM+ event receiver class. FIG. 19 shows a COM+ event receiver object with event handler functions hooked to events of a COM+ event source object, as described in FIGS. 17, 18a, and 18b.

FIG. 17 includes a code portion 1700 that specifies a COM+ event source from a "struct TMSrc" using UEPM constructs. In the code portion, 1720, the "event_source" attribute indicates that the "struct TMSrc" (which is declared with the "_gc" keyword for COM+ ) will source events using the UEPM.

The code portion 1710 includes a declaration for a multicast delegate. This explicit declaration names the delegate and provides type information and arguments for the delegate. If a delegate declaration is not provided for an event specified by a method (vs. a data member), the compiler automatically generates a multicast delegate (e.g., with the name "_Delegate_X," where "X" is the name of the event method) having an appropriate signature for the event. In the illustrative embodiment, COM+ delegates cannot be overloaded, but in alternative embodiments overloading is allowed.

When the compiler encounters the first "_event" declaration in the code portion 1730, the compiler generates code in the nearest namespace scope for defining the structure and functions of a delegate for the event "OnClick." The delegate inherits from the class for multicast delegates and stores data for an event handler function of an event receiver object. This data can be represented as a pointer to the object and a method offset. The delegate exposes a function "Invoke" that can be called to invoke the event handler function(s) pointed to by the delegate. Event handler functions can be combined into the multicast delegate or removed from the multicast delegate. Event system services provide the functionality for combining event handler functions in a delegate, removing event handler functions from a delegate, and invoking event handler functions.

Into the member scope of the "struct TMSrc," the compiler injects code for working with the event system-provided services of the delegate for "OnClick." The compiler adds a pointer (initialized to null) that references the multicast delegate "OnClick," and adds the functions "add_OnClick," "remove_OnClick," and "raise_OnClick."

As a COM+ object, metadata describes the "_gc struct TMSrc." This metadata is annotated to reflect the presence of events. In particular, "add_OnClick," "remove_OnClick," and "raise_OnClick" are registered with the event system as being used to hook, unhook, and fire the event "OnClick." The compiler creates prototypes for the functions "add_OnClick," "remove_OnClick," and "raise_OnClick" using corresponding metadata tokens for these functions.

The "add_OnClick" function takes as an argument another pointer to a new delegate. The "add_OnClick" function calls the system-provided combine function to combine the new delegate with the existing multicast delegate, which in effect adds the event handler method pointed to by the new delegate to a list of event handler methods in the existing multicast delegate. Alternatively, the operator "+=" is intrinsically defined on the delegate pointer "OnClick," and can be used to express the functionality of "add_OnClick," for example, so "pES-→OnClick +=pH" is equivalent to "pES-→add_OnClick(pH)."

The "remove_OnClick" function takes as an argument a pointer to a delegate. The "remove_OnClick" function calls the system-provided remove function to remove the specified delegate from the existing multicast delegate, which in effect removes the event handler method pointed to by the specified delegate from the list of event handler methods in the existing multicast delegate. Alternatively, the operator "-=" is intrinsically defined on the delegate pointer "OnClick," and can be used to express the functionality of "remove_OnClick," for example, so "pES-→OnClick -=pH" is equivalent to "pES-→remove_OnClick(pH)."

The "raise_OnClick" function takes as arguments the arguments of the event/event handler, which for "OnClick" are an integer and a floating point number. The "raise_OnClick" function calls the system-provided invoke function of the existing multicast delegate to call the event handler functions pointed to in the list in the multicast delegate. Alternatively, the syntax "OnClick([<arg list>])" results in a call to raise_OnClick.

In the code portion 1730, the compiler also encounters the "_event" declaration for the event "OnDblClick." Since it is a COM+ event method, the compiler searches for a delegate named "_Delegate_OnDblClick." If one is found, then the compiler checks the signature to see if it matches "OnDblClick." If it does not match, then an error is emitted, otherwise that delegate is used to implement the event "OnDblClick." If no such delegate is found, then one is injected by the compiler. The compiler then inserts code for the event "OnDblClick" that is analogous to the code inserted for the event "OnClick." The code portion 1740 includes code for a method "FireEvents" that fires the events "OnClick" and "OnDblClick."

Alternatively, the compiler performs different operations (e.g., as described in Section IV. Programming Environment) to provide code for implementing eventing for the COM+ event source class. Moreover, instead of providing the code described above with reference to FIG. 17, the compiler can provide equivalent code.

Source Code Listing for a COM+ Event Receiver Class

FIGS. 18a and 18b include a code portion 1800 specifying a COM+ event receiver from a "struct EventReceiver" using UEPM constructs. In the code portion 1810, the "event_receiver" attribute indicates that the "struct EventReceiver" (which is declared with the "__gc" keyword for COM+) will receive COM+ events using the UEPM. The code portion 1820 includes an event handler function "Handler1" for "OnClick" and two event handler functions "Handler2" and "Handler3" for "OnDblClick."

When the compiler encounters the "__hook" functions in the code portion 1830, the compiler replaces them with calls to the "add_OnClick" function or the "add_OnDbiClick" function on the specified event source. For example, the compiler replaces "__hook(&EventSource::OnClick, pES, &EventReceiver::Handler1)" with "pES-→add_OnClick (new ClickEventHandler(this-→Handler1))," where new "ClickEventHandler" creates a delegate for the "Handler1))" function of the event receiver that is then passed to "add_OnClick." Alternatively, the operator "+=" can be used to express the functionality of "add_OnClick," for example, "pES-→OnClick+=new ClickEventHandler(this-→Handler1)."

Similarly, the "__unhook" functions in the code portion 1840 are replaced with calls to a "remove_OnClick" function or a "remove_OnDblClick" function on a specified event source. For example, the compiler replaces "__unhook (&EventSource::OnClick, pES, &EventReceiver::Handler1)" with "pES-→remove_OnClick(new ClickEventHandler(this-→Handler1))," where new "ClickEventHandler" creates a delegate for the "Handler1" function of the event receiver that is then passed to "remove_OnClick." Alternatively, the operator "-=" can be used to express the functionality of "remove_OnClick," for example, "pES-→OnClick-=new ClickEventHandler(this-→Handler1)."

The code portion 1850 includes code for creating an event source and event receiver, hooking up event handler functions in the event receiver to events, firing events, and unhooking the event handler functions.

Alternatively, the compiler performs different operations (e.g., as described in Section IV. Programming Environment) to provide code for implementing eventing for the COM+ event receiver class. Moreover, instead of providing the code described above with reference to FIGS. 18a and 18b, the compiler can provide equivalent code.

COM+ Event Source and Receiver Objects

FIG. 19 shows a COM+ event source 1940 and a COM+ event receiver 1960 with event handler functions hooked as described in FIGS. 17, 18a, and 18b. The event source includes functions and data for the events "OnClick" and "OnDblClick," which are implemented through delegates. A pointer 1942 point to a delegate 1910 for "OnClick," while a pointer 1944 points to a delegate 1920 for "OnDblClick." Each delegate includes a list of receiver/event handler functions that are hooked to the event for the delegate.

When the function "AddHandlers" of the event receiver 1960 is called, the methods "add OnClick" and "add OnDblClick" are called on the event source 1940. An initial call creates a multicast delegate for the event using the system-provided combine function for the delegate. A subsequent call adds a new delegate (receiver/event handler function) to a previously created multicast delegate using the system-provided combine function for the delegate. After the event handler functions of the event receiver 1960 are hooked, the delegate 1910 keeps a list that includes a pointer to the "Handler1" function of the event receiver 1960, and the delegate 1920 keeps a list that includes pointers to the "Handler2" and "Handler3" functions of the event receiver 1960.

When the method "FireEvents" of the event source 1910 is called, the event source calls the "raise_OnClick" and "raise_OnDblClick" functions of the event source 1910. Calling "raise_OnClick" causes the "OnClick" delegate 1910 to iterate through its list of receiver/event handler function pointers, calling "pER-→Handler1" with passed in parameters. Calling "raise_OnDblClick" causes the "OnDblClick" delegate 1920 to iterate through its list of receiver/event handler function pointers, calling "pER-→Handler2" and "pER-→Handler3" with passed in parameters.

When the "RemoveHandlers" method of the event receiver 1960 is called, the event receiver 1960 calls the methods "remove_OnClick" and "remove_OnDblClick" on the event source 1940. These calls remove a receiver/event handler function from the list of a multicast delegate using the system-provided remove function for the delegate.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a method of generating a protocol-specific eventing implementation specified through protocol-independent programming constructs, the method comprising:

selecting a protocol for a protocol-specific eventing implementation from among plural protocols specifiable through protocol-independent programming constructs;

parsing one or more protocol-independent programming constructs;

based upon the one or more protocol-independent programming constructs, generating the protocol-specific eventing implementation for operating according to the selected protocol.

2. The method of claim 1 wherein a first protocol-independent programming construct specifies an event, wherein the implementation is for an event source class, and wherein the generating comprises:

generating code for adding a handler to a list for the event; and generating code for removing a handler from the list for the event.

3. The method of claim 2 wherein the generating the implementation further comprises:

generating code for calling the handlers in the list upon a firing of the event.

4. The method of claim 2 wherein a second protocol-independent programming construct specifies a firing action for the event.

5. The method of claim 1 wherein the implementation is for an event receiver class, wherein a first protocol-independent programming construct specifies a hooking action, wherein a second protocol-independent programming construct specifies an unhooking action, and wherein the generating comprises:

generating code for calling a register function for an event with a handler as specified in the hooking action;

generating code for calling an unregister function for an event with a handler as specified in the unhooking action.

6. The method of claim 5 wherein the code accepts a handler parameter and an event parameter as specified at run time.

7. The method of claim 1 wherein the plural specifiable protocols include a first protocol that operates through handler functions and a second protocol that operates through interfaces with handler functions.

8. The method of claim 7 wherein the plural specifiable protocols further include a third protocol that operates through delegates for handler functions.

9. The method of claim 1 wherein the selecting comprises:

determining a default protocol based upon a class type.

10. The method of claim 1 further comprising:

before the selecting, receiving a first protocol-independent programming construct that indicates the protocol to be selected.

11. The method of claim 1 further comprising:

before the selecting, receiving a source code file that includes the one or more protocol-independent programming constructs.

12. In a computer system, a computer executable compiler system that generates a protocol-specific eventing implementation specified through a unified event programming model, the compiler system comprising:

a front end module that receives a file including plural unified event programming model constructs;

a converter module that converts the plural unified event programming model constructs into an intermediate representation of an eventing implementation for a specific eventing protocol; and a back end module that generates the eventing implementation based upon the intermediate representation.

13. The compiler system of claim 12 wherein a second unified event programming model construct specifies an event, wherein the eventing implementation is an event source class, wherein the back end modules generates code for adding a handler to a list for the event; and wherein the back end module generates code for removing a handler from the list for the event.

14. The compiler system of claim 12 wherein the eventing implementation is an event receiver class, wherein the back end module generates code for hooking a handler with an event, and wherein the back end module generates code for unhooking a handler from an event.

15. The compiler system of claim 14 wherein the code accepts parameters at run time that specify the handler and the event.

16. The compiler system of claim 12 wherein the eventing implementation is for a native class, and wherein the specific eventing protocol operates through pointers to handler functions.

17. The compiler system of claim 12 wherein the specific eventing protocol operates across interfaces.

18. The compiler system of claim 12 wherein the specific eventing protocol operates through delegates.

19. A computer readable medium having stored thereon computer executable instructions for performing a method of implementing an event source class specified through a unified event programming model, the method comprising:

setting a protocol for an event source class, the set protocol having a corresponding implementation framework under a unified event programming model that supports plural implementation frameworks;

receiving one or more event specifier constructs, each event specifier construct specifying an event for the event source class, wherein the unified event programming model includes the one or more event specifier constructs;

implementing the event source class by generating code for each event specifier construct under the implementation framework for the set protocol.

20. The computer readable medium of claim 19 wherein the generating code for each event specifier construct includes:

generating code for adding a handler to a list for the event specified by the event specifier construct; and generating code for removing a handler from the list for the event specified by the event specifier construct.

21. The computer readable medium of claim 20 wherein the generating code for each event specifier construct further includes:

generating code for calling the handlers in the list upon a firing of the event specified by the event specifier construct.

22. The computer readable medium of claim 19 wherein the set protocol operates through delegates or operates across interfaces.

23. The computer readable medium of claim 19 wherein the method further comprises:

before the setting, receiving a protocol setting construct that indicates the protocol to be set.

24. The computer readable medium of claim 19 wherein a source code file includes the one or more event specifier constructs.

25. A computer readable medium having stored thereon computer executable instructions for performing a method of implementing an event receiver class specified through a unified event programming model, the method comprising:

receiving one or more hook specifier constructs, each hook specifier construct specifying a hooking action for an event, wherein a unified event programming model includes the one or more hook specifier constructs, and wherein the unified event programming model supports plural implementation frameworks;

receiving one or more unhook specifier constructs, each unhook specifier construct specifying an unhooking action from an event, wherein the unified event programming model includes the one or more unhook specifier constructs;

implementing the event receiver class by,
- generating code for each hook specifier construct under an implementation framework appropriate for the event that is the subject of the hook specifier construct; and
- generating code for each unhook specifier construct under an implementation framework appropriate for the event that is the subject of the unhook specifier construct.

26. The computer readable medium of claim 25 wherein the generating code for each hook specifier construct includes generating code for registering a handler with an event, and wherein the generating code for each unhook specifier includes generating code for unregistering a handler from an event.

27. The computer readable medium of claim 26 wherein a handler and an event are specified as parameters at run time.

28. The computer readable medium of claim 25 wherein the implementation framework operates through delegates or operates across a connection point interface.

29. The computer readable medium of claim 25 wherein a source code file includes the one or more hook specifier constructs and the one or more unhook specifier constructs.

* * * * *